United States Patent [19]
Jost

[11] Patent Number: 5,899,489
[45] Date of Patent: May 4, 1999

[54] INFLATABLE SAFETY RESTRAINT FOR VEHICLE OCCUPANT PROTECTION

[75] Inventor: Stefan Jost, Wiesbaden, Germany

[73] Assignee: Breed Automotive Technology, Inc., Lakeland, Fla.

[21] Appl. No.: 08/809,010

[22] PCT Filed: Sep. 8, 1995

[86] PCT No.: PCT/GB95/02149

§ 371 Date: May 27, 1997

§ 102(e) Date: May 27, 1997

[87] PCT Pub. No.: WO96/07563

PCT Pub. Date: Mar. 14, 1996

[51] Int. Cl.⁶ ................................................ B60R 21/22
[52] U.S. Cl. ...................... 280/730.2; 280/743.1
[58] Field of Search ............................. 280/730.1, 730.2, 280/743.1, 728.2, 743.2, 741

[56] References Cited

U.S. PATENT DOCUMENTS

| | | |
|---|---|---|
| 3,617,073 | 11/1971 | Landsman et al. . |
| 5,308,112 | 5/1994 | Hill et al. . |
| 5,322,322 | 6/1994 | Bark et al. . |
| 5,498,030 | 3/1996 | Hill et al. ............................. 280/730.2 |
| 5,556,128 | 9/1996 | Sinnhuber et al. .................. 280/730.2 |
| 5,588,672 | 12/1996 | Karlow et al. ....................... 280/730.2 |
| 5,630,616 | 5/1997 | McPherson ......................... 280/730.2 |

FOREIGN PATENT DOCUMENTS

| | | |
|---|---|---|
| 0565501A1 | 10/1993 | European Pat. Off. . |
| 4307175A1 | 9/1993 | Germany . |
| 3276844 | 9/1991 | Japan . |
| 2191450 | 12/1987 | United Kingdom . |
| 2232936 | 1/1991 | United Kingdom . |

*Primary Examiner*—Paul N. Dickson
*Attorney, Agent, or Firm*—Markell Seitzman

[57] ABSTRACT

An inflatable safety restraint arrangement is provided which is particularly helpful to protect vehicle occupants from transverse components of crash forces such as are experienced in side impacts. An inflatable cushion (8) in the deflated state is foldled and mounted in a flexible pocket and is fixedly attached to Ihe vehicle at at least two spaced positions. The flexible pocket comprises a line of weakness such as a tear seam along which the pocket opens when subjected to forces generated during inflating of the cushion and through which the inflating cushion deploys to a position between the vehicle occupant and the adjacent vehicle surface (e.g. door) in the event of a crash situation being detected. The flexible pocket is preferably fabric though it may be of a plastics material and the tear seam comprises a stitched seam the stitches of which either break or unravel when the airbag cushion is deployed.

32 Claims, 18 Drawing Sheets

INFLATABLE SAFETY RESTRAINT FOR VEHICLE OCCUPANT PROTECTION

The present invention relates to an inflatable safety restraint or airbag for protecting an occupant of an automobile in a crash situation particularly from transverse components of crash forces, such as are produced in side or oblique impacts.

In particular the invention relates to the construction and shape of an inflatable airbag and to an inflator for such an airbag and to means for housing the inflator and the airbag in appropriate positions relative to the automobile occupant and to means for deploying the airbag quickly and for maximum protective effect.

BACKGROUND OF THE INVENTION

It has been proposed in known systems to protect vehicle occupants during a side impact collision by introducing an airbag between the occupants torso and an interior surface of the vehicle. U.S. Pat. No. 3,617,073 is illustrative of a system in which an airbag protective system is located within the vehicle door. British Patent 2 232 936 B shows an airbag mounted in a vehicle seat.

With regard to seat mounted airbag systems it is desirable for the airbag and its associated mounting hardware to be constructed in a way that it is compatible with seat design and does not interfere with occupant comfort. All known airbag technologies mount the airbag in a rigid cover. This type of construction if placed behind the soft, compliant foam padding (or seat cover) of the seat reduces the resiliency of the padding lessening occupant comfort.

Inflators for airbags are necessarily bulky and heavy items since they contain compressed gas for inflation which must be safely contained. Traditionally an inflator comprises a cylindrical steel container which is mounted in a metal housing into which the airbag is folded. The resultant package which must be fitted into an automobile is bulky and unsightly and problems have been encountered in mounting such packages in the optimum positions within an automobile for safety purposes while satisfactorily disguising them to the satisfaction of interior designers, particularly in arrangements for protection against side impact forces.

SUMMARY OF THE INVENTION

Accordingly the present invention provides an inflatable safety restraint arrangement for protection of a vehicle occupant from transverse components of crash forces, the arrangement comprising an inflatable cushion which in the deflated state is folded and mounted in a flexible pocket, the cushion being fixedly attached to the vehicle at at least two spaced positions, the flexible pocket comprising a line of weakness alone which the pocket opens when subjected to forces generated during inflation of the cushion and through which line of weakness the inflating cushion deploys, the pocket being mounted in the vehicle such that the cushion deploys to a position between the vehicle occupant and an adjacent vehicle surface in the event of a crash situation being detected.

The flexible pocket is preferably of fabric material, eg a woven medium, and the line of weakness comprises a stitched seam which may be adapted to open by tearing along the stitching on deployment of the cushion or alternatively by unravelling the stitching.

Alternatively a flexible plastics material may be used for the pocket and for example formed by folding a single piece of plastics material and securing that open edge (through which the airbag cushion is to be deployed) by glue, crimping or rivets such as plastic so-called "Christmas Tree" fasteners, to form the line of weakness through which the cushion will deploy.

According to a preferred embodiment of the present invention the flexible pocket is mounted in a vehicle seat, preferably within a cover of the seat in such a way as to follow the contours of the seat. Preferably one of the attachment positions of the cushion to the vehicle is in line with or above the shoulder of the vehicle occupant.

The line of weakness may advantageously be aligned with a seam of the seat cover, or with an otherwise relatively weaker part of the cover, so that the inflating cushion deploys through the line of weakness and thus through a predetermined location on the seat such as the seam of the seat cover. The line of weakness in the pocket and the seam in the cover may in fact be one and the same, eg the same stitching forming seams in the pocket and the cover, or the seat cover being constructed so as to form the pocket itself The pocket and the seat cover need not be positively connected but if they are then preferably the pocket is sewn to the seat cover with a seam which is stronger than the tear seams in either the pocket or the cover.

The opening of such a seam is controlled since the thread, typically 100–500 Newton of tear strength is designed to be the weakest point of the system, whereas in existing technologies the cushion hits the seat cover during deployment somewhat like a fist and breaks the cover material or the thread in an uncontrolled manner, and then parts of the seat cover material can be ejected towards the occupant.

Preferably the arrangement of this preferred embodiment further comprises an inflator mounted directly to a part of a seat frame for example by mounting in a seat frame tube such that the seat tube provides a housing for the inflator. Preferably the main seat tube is used, i.e. that running generally horizontally in the lower backrest of a seat, in the area corresponding generally to the "small" of an occupant's back. This is particularly useful for an inflator of the type which is known generally as a 25 mm hybrid inflator since this can fit easily into such a seat frame tube. The inflator may be slotted into the tube or screwed in with appropriate cooperating threads being provided in the seat frame and the inflator container or alternatively bolted or screwed to rigid parts of the seat frame.

The necessary wiring to the crash sensor and inflator actuator is thus also advantageously protected by the seat tube.

This arrangement provides advantages in that the number of components is reduced over prior art systems because a separate inflator housing is unnecessary since the seat frame provides sufficient support and strength. There are attendant cost savings, and advantages in versatility since the airbag or inflatable cushion can easily and accurately be positioned in alternative locations to optimise safety.

Furthermore it has been determined that the delta v of the occupant's ribs due to accidental inflation induced injuries are much lower than with compressed folded traditional side impact airbags, since with the invention the line of weakness (such as the tear seam) provides for controlled opening of the seam which opens like a zip, and also because the arrangement allows the cushion to be prefolded along a larger section of the side of the seat than with known systems. Hence the initial acceleration of the cushion is reduced and the arrangement of the invention is safer for the occupant than conventional arrangements with rigid housings.

The two attachment points for the cushion allow accurate positioning of the cushion for the desired relative amounts of head and thorax protection of the occupant to be achieved and offer the possibility of protecting a larger area of the vehicle occupant with a relatively smaller cushion. For example, it makes it easier to customise the cushion position to the unique geometry of a particular automobile, the particular requirements of safety regulatory bodies in different countries and the different average sizes and dimensions of automobile occupants in different countries.

Preferably the arrangement is such that the finished module is of a length which is smaller than the height of the back of the seat, thereby permitting the module to be mounted at any one of many locations within the seat back without distracting from occupant comfort or requiring the seat manufacturer to alter his specifications.

The invention provides for a compact lightweight arrangement which does not protrude from the contours of the mounting area (eg the seat) and is therefore comfortable, and visually acceptable to the occupant.

The inflatable cushion may take many forms and shapes. A particularly advantageous shape is an elongate arcuate shape, such as a fat sausage or banana shape with the two attachment points at opposite ends. The cushion is preferably premoulded in this shape with a fat central portion and tapering end regions.

A single manifold, for connection to an inflator, is preferably provided at one end of the cushion, for example in combination with one of the attachment points.

It has been found by the inventor that such an arcuate elongate shape encourages a fixed direction of inflation on deployment of the airbag whereas traditional airbags require a rigid housing not only to hold the uninflated airbag but to encourage the optimum direction of inflation. Additionally, this shape of the cushion provides the possibility, not only of stabilising the harder parts of the body such as the shoulder and pelvis areas, but also gives a soft buffer for the softer abdomen area, and for the head.

Even more preferably the airbag cushion comprises a first portion extending between the two attachment points for torso protection and a further portion extending away from one of the attachment points for protection of an occupant's head.

In another preferred embodiment of the invention one or more rip cords are sewn or otherwise secured to the cushion, preferably at a region of the cushion which is furthest from the attachment points on inflation, and the other end of the rip cord is secured to one end of the line of weakness or seam so as to facilitate tearing of the seam. The rip cord could also be connected to the yarn of the tear seam so that when the cushion is deployed, the yarn is pulled and unravelled thus opening the tear seam in an unzipping action.

This has the advantage that the cushion is inflated through a predetermined location on the seat without the need for expensive housing arrangements.

According to an advantageous embodiment of the present invention the arrangement is provided with an inflator mechanism and an inflator manifold, wherein the inflator mechanism has an output for inflation gas constructed and arranged to direct gas flow onto an inside wall of the manifold so as to retain the manifold in the cushion.

This arrangement has the added advantage of protecting the cushion mounting area from the direct effects of the hot gas flow from the inflator. Also, the inflator and the cushion can be mounted at an angle of anything between between 0 and 180° to each other allowing for versatility in mounting the inflator and the cushion in awkward locations.

The manifold opening in the cushion may be an open slit seam of a width approximately equal to half the outside circumference of the inflator manifold so as to fit snugly round the manifold.

The manifold may comprise a plastics material and preferably a polyvinylchloride (PVC) material or alternatively a nylon material.

In this embodiment the outer manifold surface may be welded to a manifold mounting area of the cushion to form a preferably continuous welded seal between the airbag and the manifold. Such a welded seal may be formed by ultrasonic radiation whereby heat stakes are positioned at spaced intervals in a region around the gas inlet of the cushion on the outer manifold surface to effect the required bond between the plastics manifold and the cushion fabric. However stitching may be used.

Such a manifold fixing means is applicable to any form or shape of cushion and may be used for other than side impact airbag arrangements.

The shape of the pocket is chosen to provide the optimum tear direction. The pocket is thus preferably tapered towards one end and arranged in conjunction with the cushion and the inflator so that it starts to open at the widest portion. The pocket may be mounted in a seat either with the wider portion at the lower part or at the higher part and the tear direction corresponds accordingly.

In an alternative embodiment of the invention the inflatable cushion is mounted in the roof of the vehicle, eg to the upper roof structure above an occupants door, and preferably out of sight of the vehicle occupant by being sited above the roof lining material. The flexible pocket may then have its line of weakness aligned with a seam in the roof lining, or may be a common seam therewith, i.e. a single line of stitching may form the pocket seam and the roof lining seam and is nonetheless a relatively weak part of the pocket construction and will split when the cushion is inflated to release the cushion for occupant protection. This arrangement enables the accurate yet easy and inexpensive positioning of the cushion for optimum protection of an occupant in a crash.

An inflator for such a roof mounted airbag would advantageously also be mounted above the roof lining material and be attached to the roof structure and to the cushion via a manifold.

A further alternative embodiment provides an inflator mounted in a vertical side structural beam or so called B pillar, in the region behind the vehicle occupant and connected via a manifold to the inflatable cushion which is also sited in the side beam. The inflator, either with the airbag cushion folded around it or close by, or spaced therefrom is retained in a recess in the side beam by a deployment door which is releasably attached to the side beam by means of one, or preferably a plurality of studs which may snap-fit into holes in the side beam. Preferably a strap is provided attached at one end to the side beam and at its other end to the deployment door, to restrain the door on inflation of the airbag and prevent it flying off under the forces generated in a crash situation and damaging the vehicle or its occupants. One or more hinges would be an alternative.

The shape of the housing recess in the side beam, the relative strengths of retaining studs on the deployment door together with the shape of the airbag and its points of mechanical attachment to the side beam as also the positioning of the manifold for inflation will determine the inflation pattern or sequence of the airbag and the optimum relationship of these variables for safety can be easily determined through the performance of simple tests. Slow motion playback of film or video of such an airbag inflating, or sequency photography are such tests in common use and well known to those skilled in the art today for testing airbags.

Two inflators may be housed in the side beam or roof area, one attached to each end of the airbag so as to inflate the airbag more rapidly or to inflate a larger airbag. This is particularly advantageous on the passenger's side in a vehicle since larger airbags are needed to fill the greater amount of space around a front seat passenger. The wiring to the inflator(s) and the ESPS harness is protected inside the recess in the side beam or roof pillar as appropriate.

For a better understanding of the present invention and to show how the same may be carried into effect, reference will now be made to the accompanying drawings.

BRIEF DESCRIPTION OF DRAWINGS.

FIGS. 8, 9, 9a, 9b and 9c illustrate different shapes for an airbag cushion according to embodiments of the invention.

FIG. 9d is an exploded perspective view of an airbag cushion of the shape shown in FIG. 9c.

FIGS. 19, 20 and 21 each show a cross-sectional view of a respective preferred embodiment of a manifold fixing means for use with the invention, and FIGS. 19a, 20a and 21a show plan views along arrow A of FIGS. 19, 20 and 21 respectively.

DETAILED DESCRIPTION OF DRAWINGS.

Figure 1:
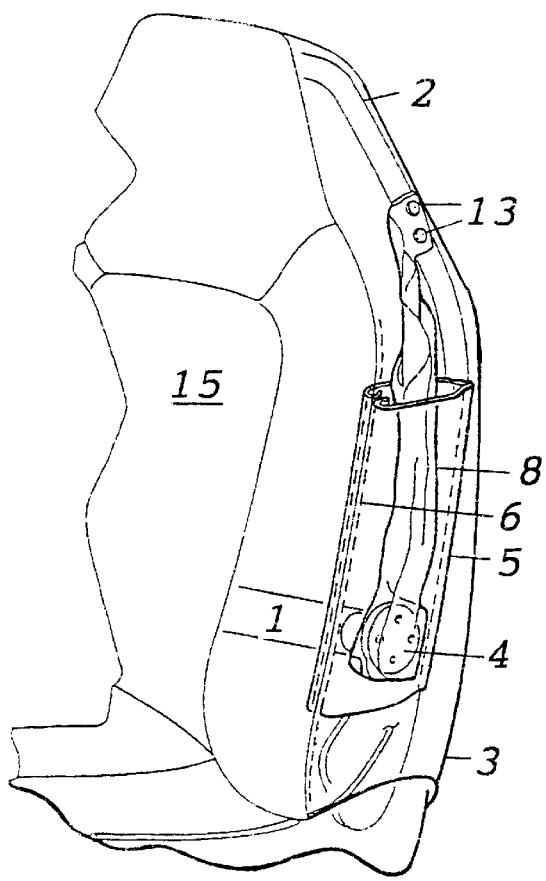
FIG. 1 is a partial sectional view of an automobile seat illustrating an inflatable safety restraint arrangement according to one embodiment of the invention.

FIG. 1 illustrates a partial sectional view of an automotive seat, showing one possible location of a seat cover integrated side impact airbag module. Shown herein is part of a seat 15 with a seat cover 3 having an airbag cushion 8 integrated in a seat cover pocket 5. This seat cover pocket 5 is made of a flexible fabric highly resistant to tearing. The folded airbag cushion 8 extends out of the cover at one end and is attached to the substructure 2 of the seat 15 by bolts or rivets through the attachment mounting holes 13. At the other side the manifold 4 projects into the cushion through the pocket 5 and makes the lower attachment-to the seat frame 2 and to an inflator 1.

The flexible pocket 5 is made of fabric and stitched to form a tube enclosing at least the central section of the airbag cushion 8. A tear seam 6 is provided in the pocket offering a line of relative weakness through which the cushion will deploy on inflation.

Figure 2B:
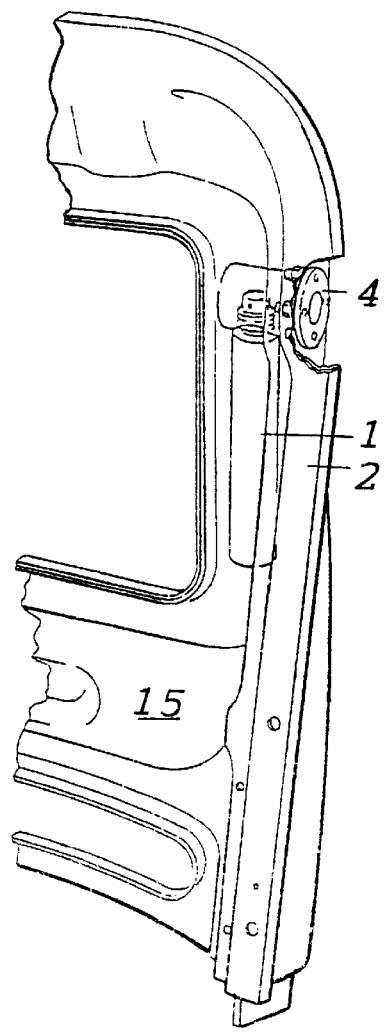
FIGS. 2a and 2b are partial sectional views of the seat of FIG. 1 arranged for vertical inflator attachment, in side elevational and in perspective view respectively.
Figure 2A:
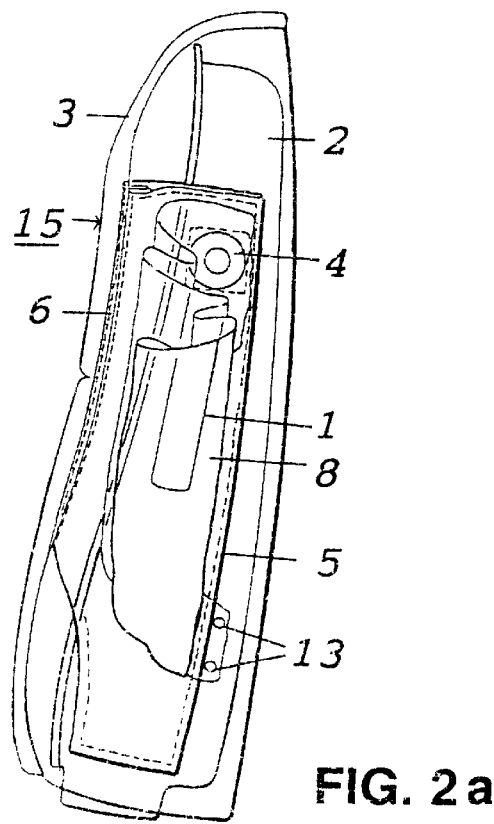

FIGS. 2a and 2b show an arrangement whereby the inflator 1 is arranged vertically within the seat structure. Here the manifold 4 is at the upper end of the airbag cushion 8 and the attachment mounting holes 13 at the lower end. The pocket 5 completely surrounds the airbag cushion 8.

Figure 3:
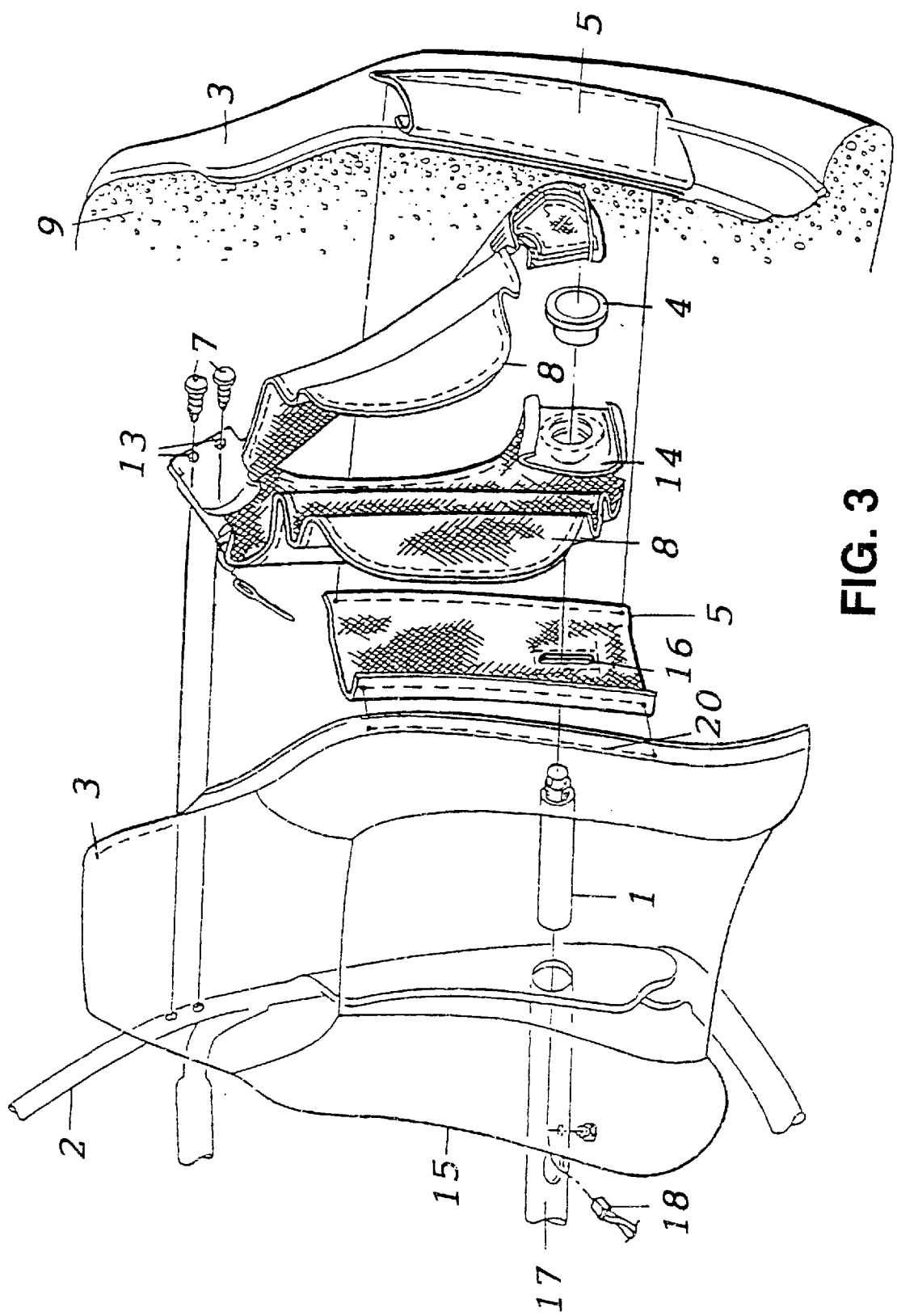
FIG. 3 illustrates an exploded view of the seat of FIG. 1.

FIG. 3 illustrates an assembly of panels to make cushion 8 and the manifold 4 inside the seat cover integrated pocket 5 and the inflator 1 and their positions relative to the seat 15. The manifold 4 is sew n inside the panels of cushion 8 with cushion reinforcements 14 in the mounting area. The manifold 4 extends through the cushion reinforcement 14 and the pocket manifold opening 16 in order to create a clamping area to the seat frame 2 and seal the complete cushion assembly. The cushion reinforcement 14 is typically of heat resistant fabric. The inflator 1 is threaded or clamped to the manifold 4. The pocket 5 is sewn to the seat cover 3 with a very strong sew line to provide a tear seam which connects the two panels of pocket 5 together with a predefined tear seam strength, preferably between 100–500 Newton. The tear seam thread and/or stitch pattern is chosen accordingly.

The inflator 1 is screwed or bolted to the seat frame tube 17 as shown and an initiator 18, shown in the form of wires, extends from an impact sensor which may be of known construction (not shown) and the inflator 1.

Figure 4:
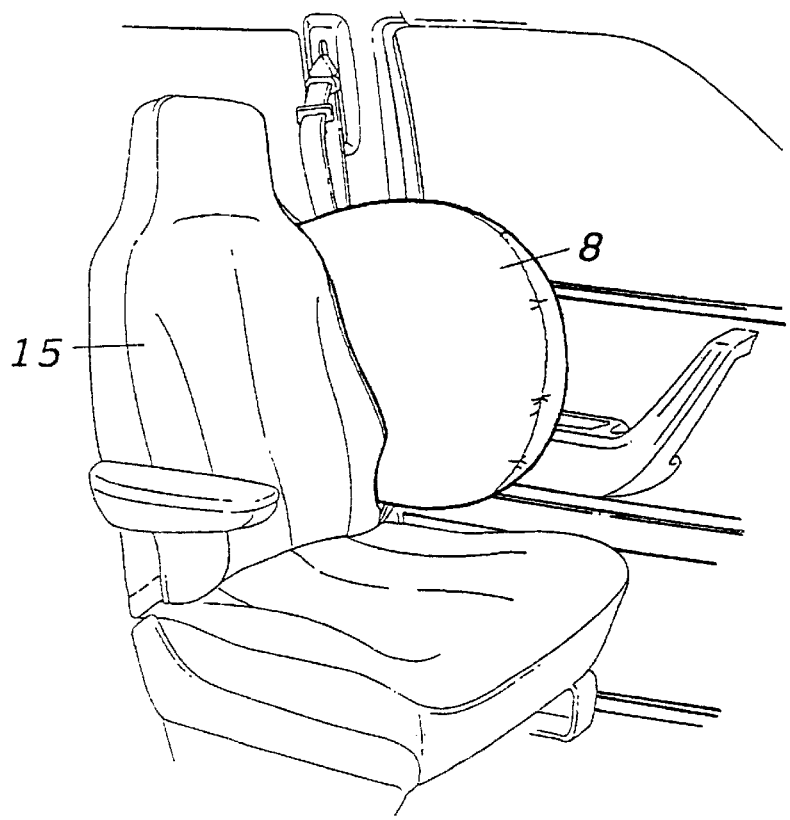
FIG. 4 illustrates a deployed inflated airbag cushion attached to a seat.

In FIG. 4 the cushion 8 is shown in the inflated state relative to the seat 15. The cushion shape is arranged to cover the area from a 5th female dummy lower rib up to the upper rib of a 95th male dummy. This is typically 3400 mm. The thickness of the cushion is between 50 and 200 mm. The third dimension, towards the steel wheel, is between 200 and 400 mm starting with the outer contour of the seat. The cushion shape at the seat area is designed to cover the outer seat foam contour in order to maximise the volume of the cushion outside of the seat contour.

Figure 5:
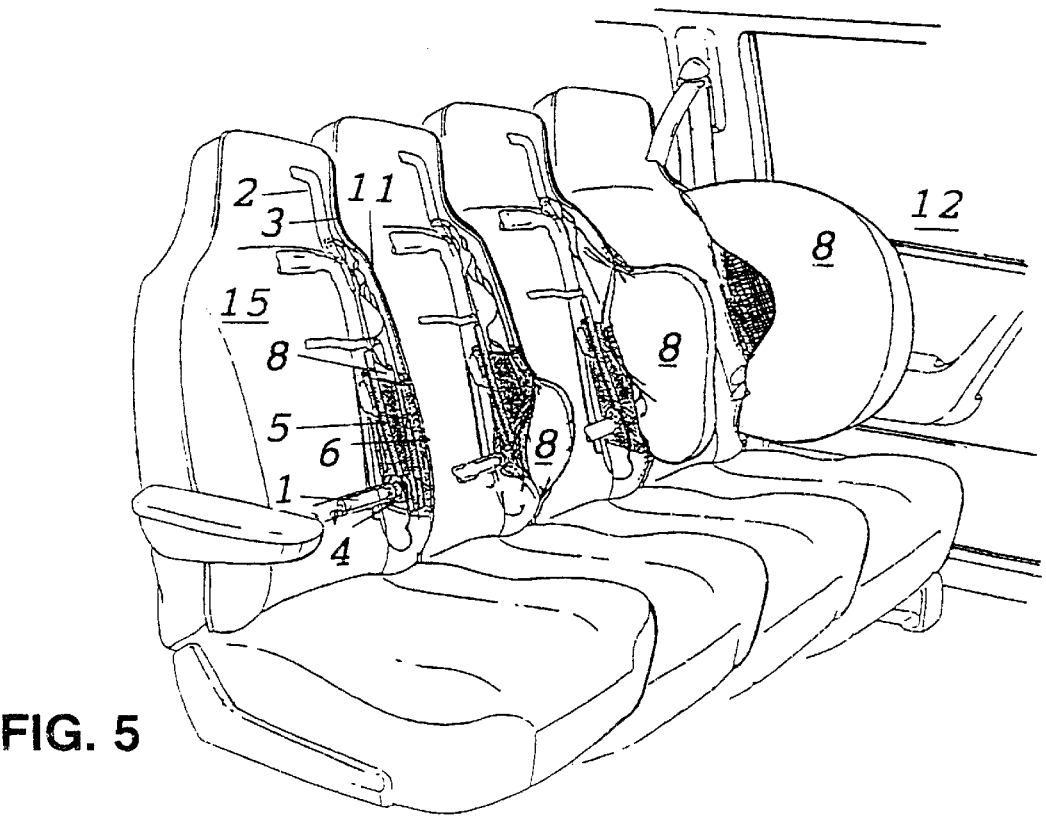
FIG. 5 illustrates a deployment sequence for an airbag arrangement according to an embodiment of the present invention.

FIG. 5 shows various stages of airbag inflation by illustrating the seat and seat cover integrated airbag in a series comprising four adjacent seats. This is of course a single seat but is shown in four different stages of airbag inflation. Positioned in the out board side 11 of the seat cover 3 is an airbag cushion 8 secured to an internal part of the seat. The inflator may be directly mounted to the seat frame by the manifold 4 and is connected to the cushion 8 via this manifold 4. The inflator 1 may be a hybrid inflator of the type which releases heated inflation gas into the airbag or an inflator that uses a solid propellant such as sodium azide, or another type of inflator. Prior to activation of the inflator 1 the airbag cushion 8 is maintained in a simple folded condition within the pocket 5 inside the seat cover 3 on the outboard side 11 of the seat 15. Subsequent to sensing an impact with the side of the vehicle (by using an impact sensor of known variety) the inflator 1 is activated thereby releasing or generating inflation gas which fills the airbag cushion 8. The airbag cushion will start to be filled inside the seat cover 3. Due to the construction of the seat cover integrated pocket 5 the initial forces will be directed to the tear seam 6. The tear seam thread is the weakest point in the complete pocket area and will be torn in a very controlled way. As the bag inflates it becomes positioned generally between the side of the occupant's thorax (and, in some embodiments, the head) and the side door or door panel 12 of the vehicle.

Figure 5A:
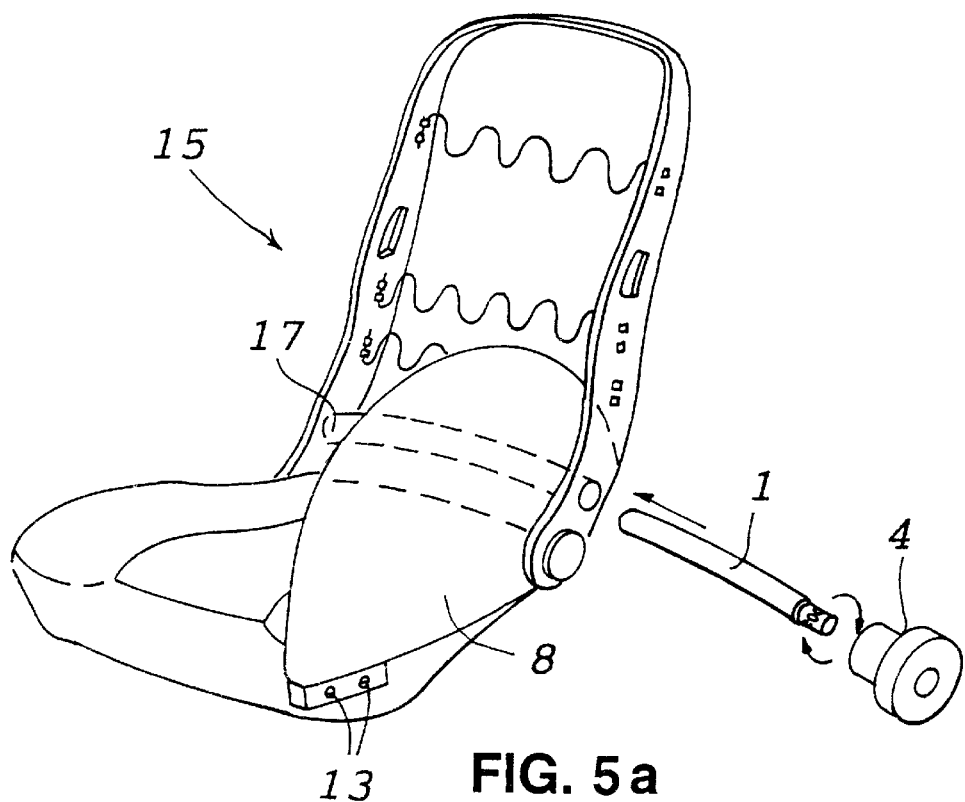
FIG. 5a illustrates an alternative mounting position on the seat for an airbag arrangement according to the invention.

FIG. 5a illustrates an embodiment where the airbag cushion 8 is mounted in the base part of the seat. The cushion 8 is shown schematically in an inflated state. The inflator 1 is housed in seat frame tube 17 and connected to the cushion 8 by manifold 4. The other end of the cushion 8 is bolted to a structural part of the seat base by cushion attachment holes 13.

Figures 6A, 6B:
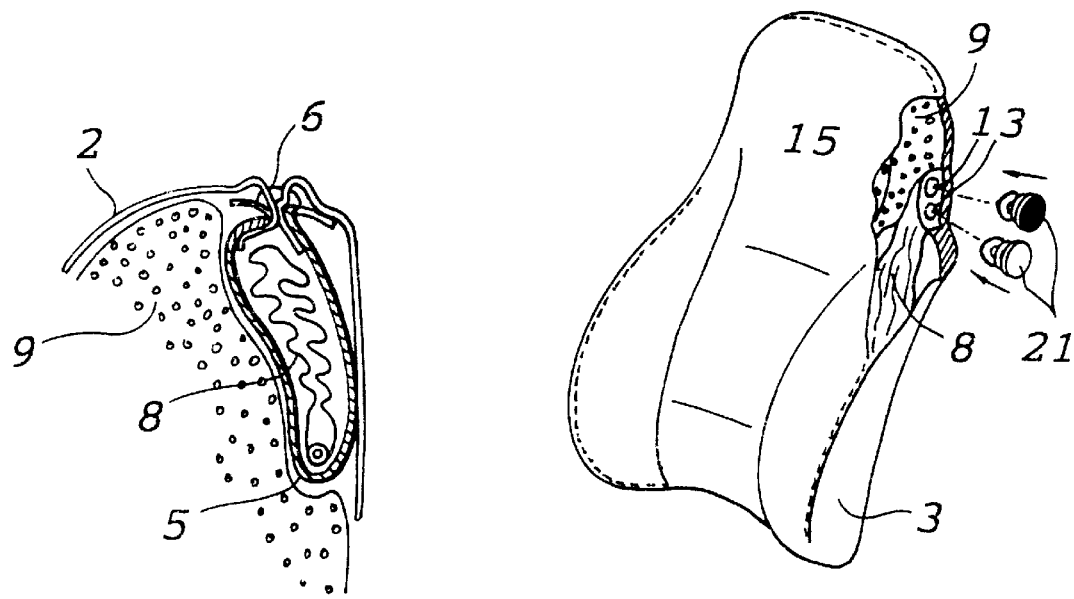
FIG. 6a is a cross-sectional view and FIG. 6b a cut away perspective view of the side of a seat illustrating an embodiment of the invention with the airbag cushion mounted in the seat.

FIG. 6a shows the tear seam concept in detail. The airbag cushion 8 is folded inside the pocket 5 within the seat cover 3 and adjacent the foam 9 of the seat. The tear seam 6 is so constructed that all other parts of the pocket 5 are stronger in tear strength. This is done using a stronger thread for the other sides than for the tear seam 6. As the bag inflates the cushion 8 will be filled inside the pocket first. The outer side walls of the pocket (made out of strong fabric material) will lead the inflation forces directly to the tear seam (which is the weakest point in the closed system) and will tear the tear seam threads 6. Hereafter the filling air will inflate the cushion further and open the complete seat cover like a "zip". Once the pocket is opened and the cushion fully inflated then the cushion is positioned generally between the occupant and the vehicle door.

FIG. 6b shows a part cut away view of a seat with airbag cushion 8 mounted within seat cover 3 adjacent seat foam 9 and attached to a part of the seat frame 2 by snap on pins 21 such as plastic "Christmas tree" poppers. The pins 21 are not shown to scale and fit through attachment holes 13.

Figure 7:
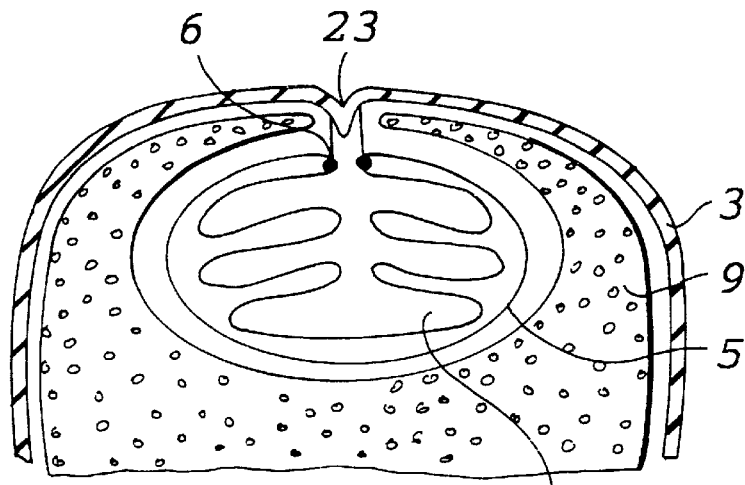
FIG. 7 is a detailed illustration in cross-section of part of a seat embodying an airbag arrangement according to the present invention.

In FIG. 7 the airbag cushion 8 is folded within pocket 5 in seat foam 9 and enclosed by the seat cover 3. Here the tear seam 6 of pocket 5 is attached to the seam 23 of the seat cover 3. Either or both seams may be formed of a chain stitch so that a pull on one side causes the stitch to unravel and open the seam. Alternatively the seam stiches may tear. Typically the type of stitches and/or the strength of thread is chosen to make a tear seam having only 40% of the strength of the fabric.

Alternatively or additionally one or more rip cords 22 may be used to attach the cushion 8 to a part of the seam or seams so as to aid the process of tearing the stitches as the cushion inflates. Such a rip cord may, for example, be sewn to an outermost point of the cushion (considered in its inflated form) and to the start of the tear seam. Thus, before deployment the cord or cords are relatively closely connected to the tear seam. During deployment the cord pulls on the edges of the seat cover material to tear the seam, or alternatively pulls the thread of the seam directly. The tear seam is required to open within 2 to 4 milliseconds to fulfill standard safety requirements.

This arrangement for the tear seam provides an inexpensive and light way of accurately controlling the deployment of a safety cushion.

There are many shapes contemplated by this invention for the airbag cushion and these are conveniently preshaped in a way which assists the cushion to inflate in a predetermined direction during deployment. The shapes can be made by cutting and sewing suitable airbag fabric, for example in the way which can be seen in the exploded view of FIG. 3.

Figure 8:
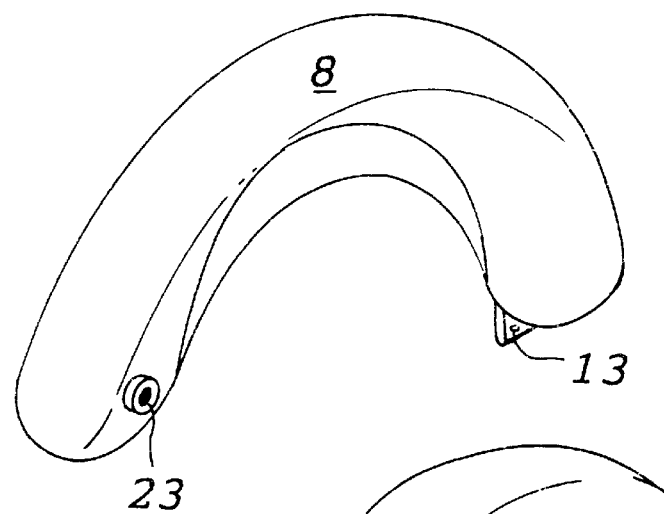

FIG. 8 shows one suitable shape. This is an arcuate sausage shape having attachment points for securement to a seat, at each end. At one end the inflation inlet 23 is provided for connection to a manifold and inflator. At the other end cushion attachment holes 13 are provided.

Figure 9:
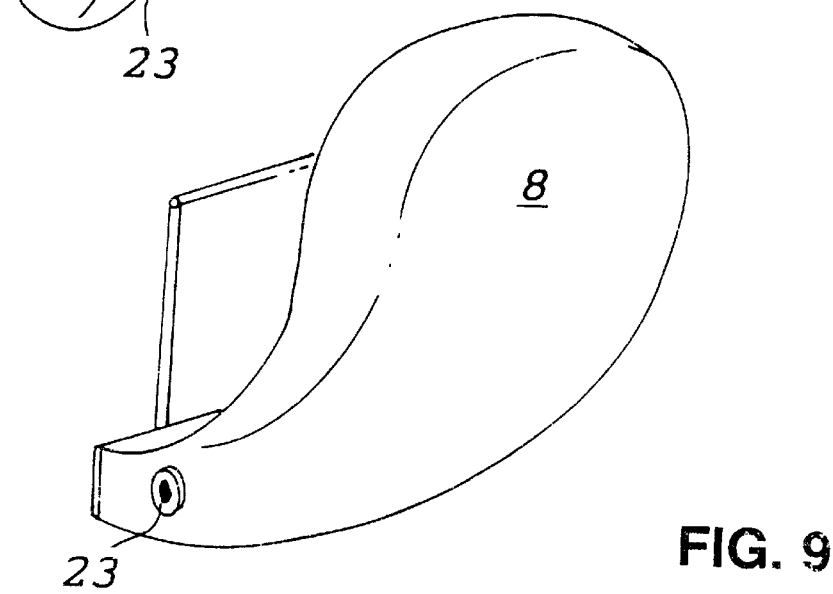

FIG. 9 shows another suitable shape. Here the cushion is fatter at one end but nonetheless has an arcuate elongate form with two attachment points (one is not known in the Figure as it is hidden).

Figure 9B:
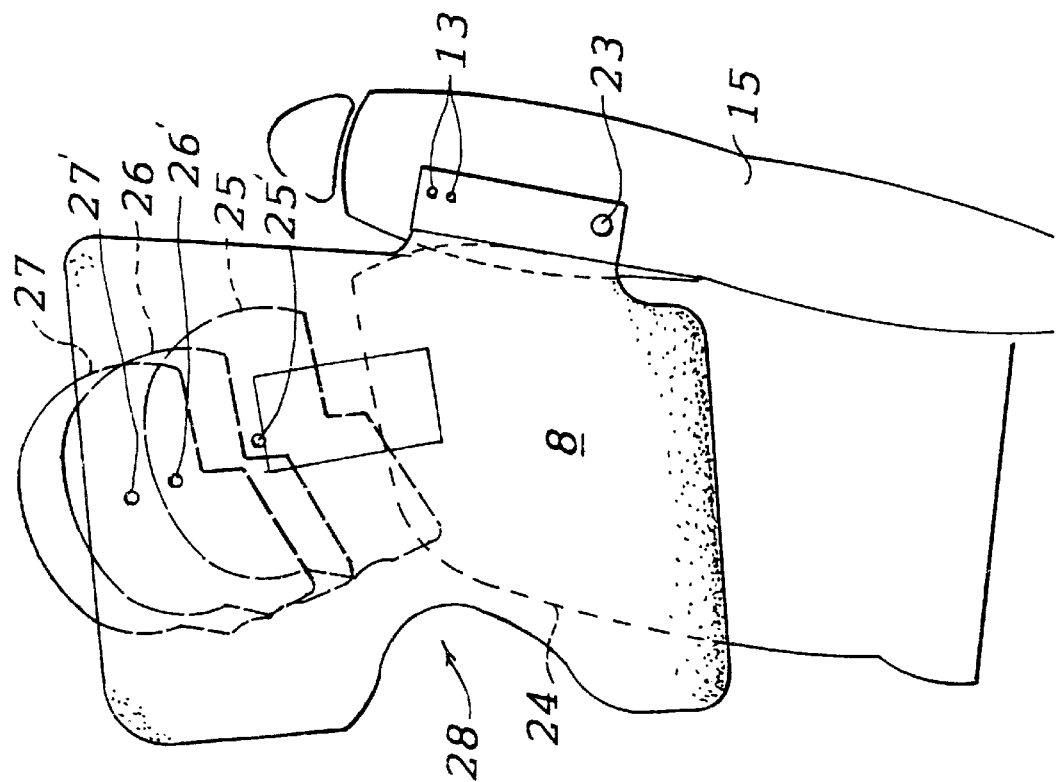
Figure 9A:
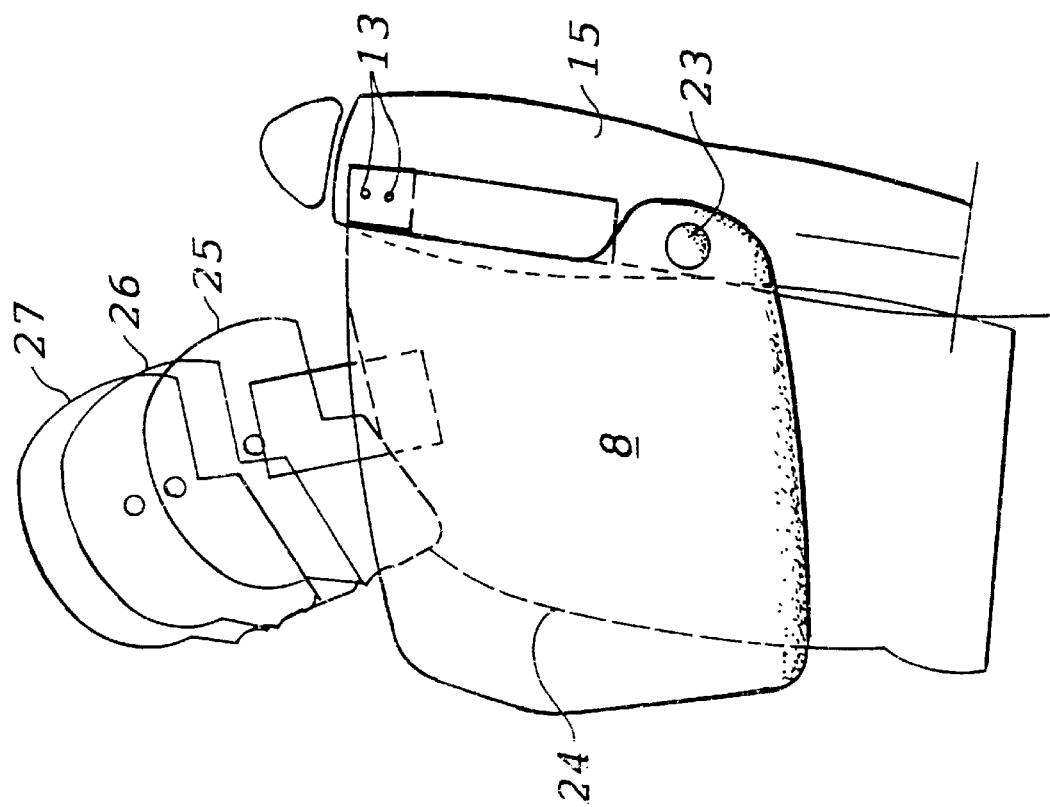
Figure 9:
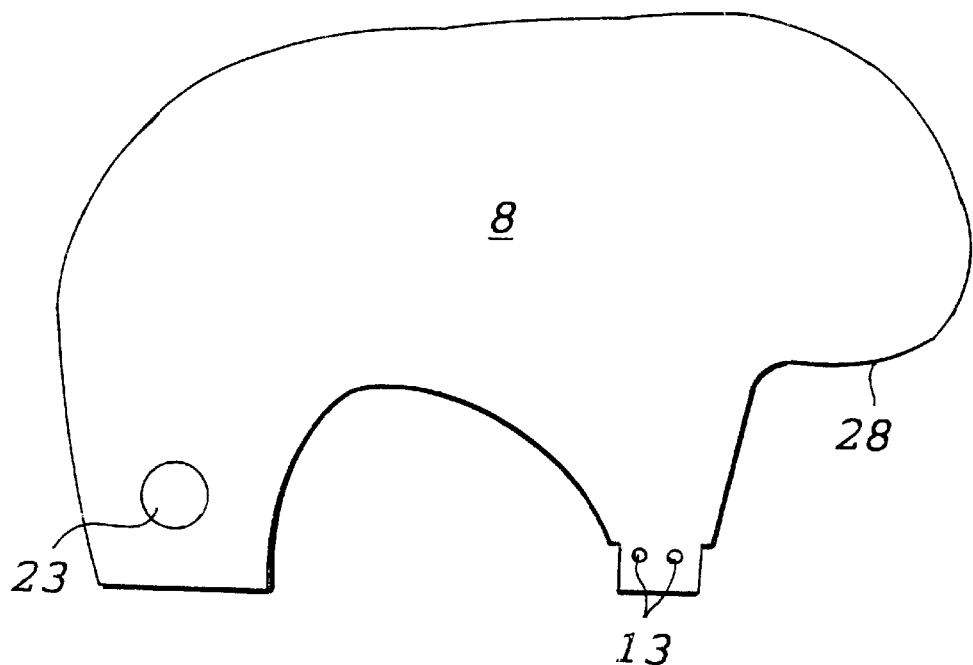

FIG. 9a is a head and shoulder concept cushion of a squarer form. The two spaced attachment points to the seat 15 are shown at 23 (inflation inlet) and 13 (attachment holes). The inflator is not shown here but may be mounted horizontally or vertically (or indeed any orientation).

The cushion 8 is shown inflated relative to the position of an occupant thorax 24 and the heads 25, 26, 27 respectively of 5th, 50th and 95th percentile dummies (as defined in standard safety restraint test regulations).

The size of the cushion shown in FIG. 9a is typically 350 mm high and 410 mm wide though a variety of sizes would suit equally well and the dimensions would in practice be tailored to the individual automobile manufacturer's requirements.

The cushion in FIG. 9b is higher than that in FIG. 9a and in side view has a forward facing recess 28 at approximately shoulder level of the occupant. A suitable height of this bag would be around 525 mm and this provides secure side protection for not only the thorax 24 of the occupant but also the head, or at least the centre of gravity (25',26',27') of the 5th, 50th and 95th percentile test dummy as shown.

FIG. 9c shows another shape of cushion in plan view. This has a more curved outline than the cushion of FIG. 9b and has a generally arcuate portion for thorax protection, falling generally between the two attachment points 13 and 23, and an extension 28 for head protection. Typical dimensions of this type of cushion would be to have an overall height of 700–750 mm, a width of 480 to 520 mm and a distance between attachments 13 and 23 of around 500–530 mnm.

FIG. 9d illustrates the cushion of FIG. 9c in exploded form whence it can be seen that it is formed of two cushion panels 29 sewn at their edges. The attachment points 13 are shown mounted by bolts or rivets to the structural frame 2 of the seat. The manifold 4 is mounted to the inflation inlet 23 and to the seat frame 2. The inflator 1 is mounted in the seat frame tube 17 and held by a screw or bolt and connected to initiator 18.

Figure 11A:
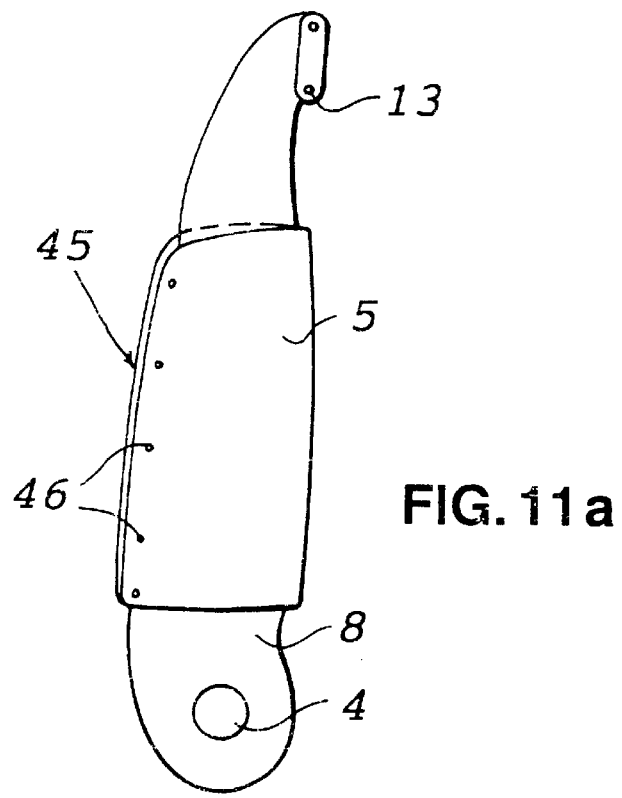
FIGS. 10, 11 and 11a show alternative pockets for airbag arrangements according to the invention.
Figure 9:
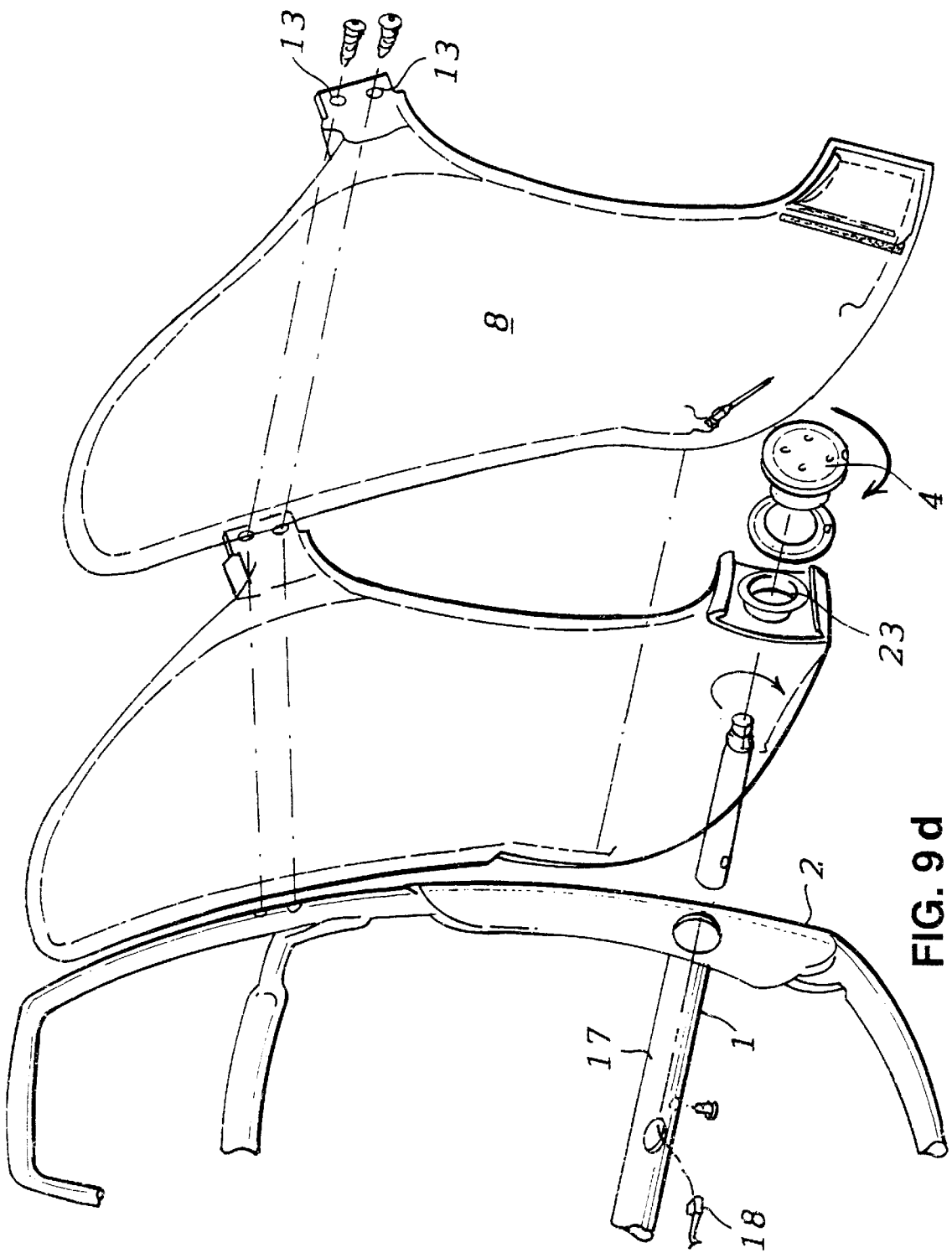
Figure 10:
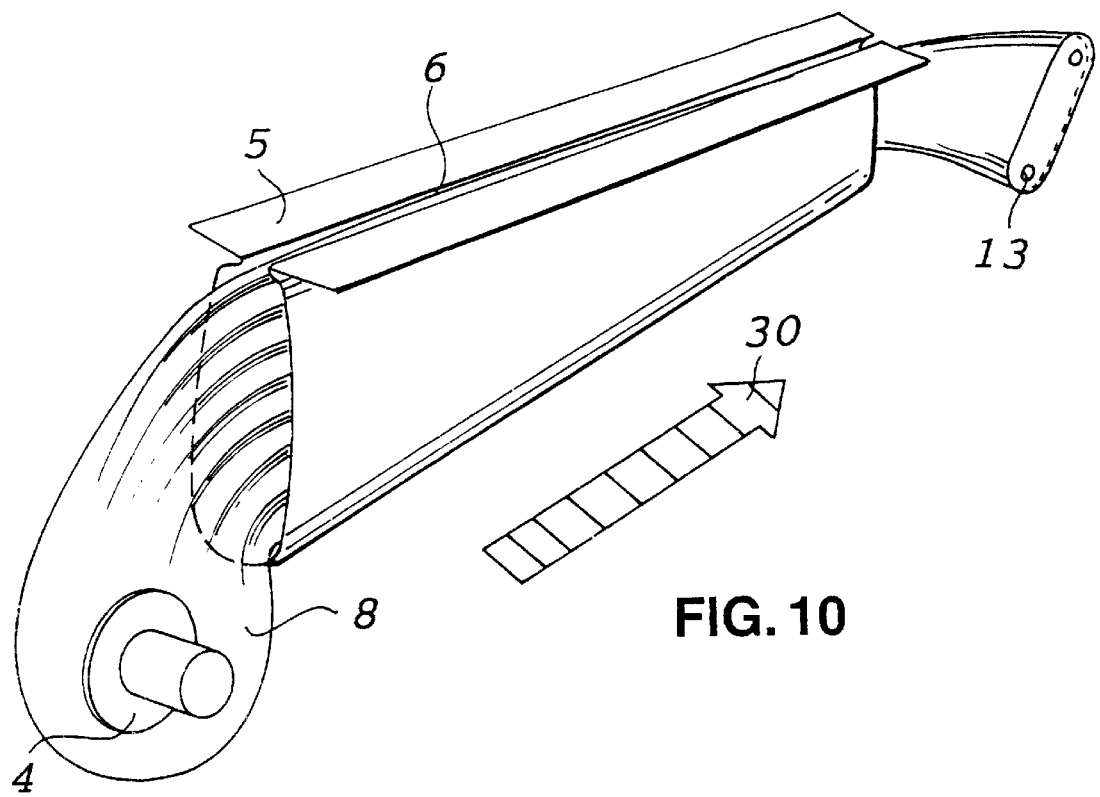
Figure 11:
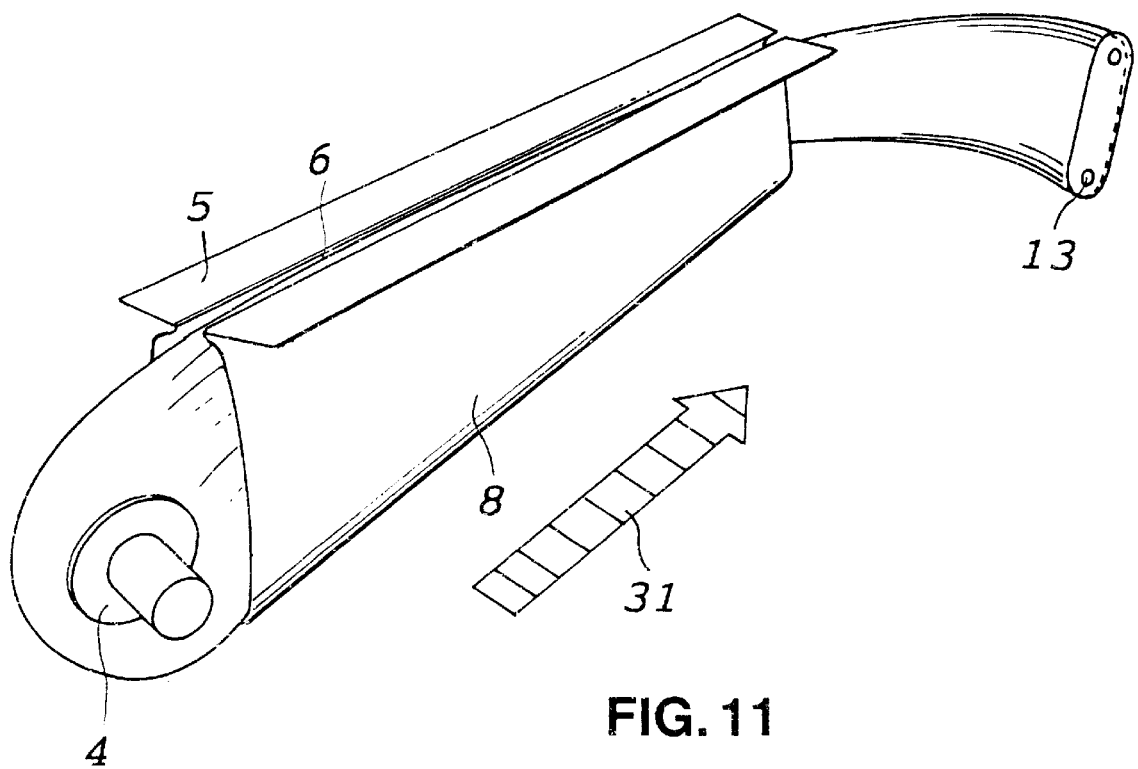

In FIGS. 10 and 11 two different shapes for pocket 5 are shown. The pocket 5 only partly encloses the folded cushion 8; the attachment parts 13 and 23 extend beyond the pocket. In each case the tear seam 6 will open from the end of the pocket which is widest toward the narrower end. This is shown by arrows 30 and 31 respectively. The pocket can be made of a woven fabric material or of a flexible plastics material. Preferably it is formed from a nylon fabric. As mentioned previously, the pocket 5 may be sewn directly to the seat cover 3 with a stronger yarn or thread than is used for the tear seam. Thus the location of tearing and of deployment of the airbag cushion is effectively predefined and the cushion will deploy within the required time frame of 2–4 milliseconds.

Such a tear seam provides a very inexpensive, light and controlled way of determining the deployment position and direction of an airbag cushion and the arrangement is easy to assemble and presents no substantial problems during seat assembly.

FIG. 11a a shows a plastic pocket 5, partially enclosing a folded airbag cushion 8. The edge 45 which forms the line of weakness of the pocket 5 is joined by plastic studs 46 such as the known arrow headed versions or "Christmas tree" studs. In this case there is no direct connection between the pocket seam and the seat cover seam.

Figure 12A:
FIGS. 12 and 13 illustrate an inflatable safety restraint arrangement according to the invention in deflated and inflated state respectively, showing an airbag cushion mounted in the roof of a vehicle.
Figure 12B:
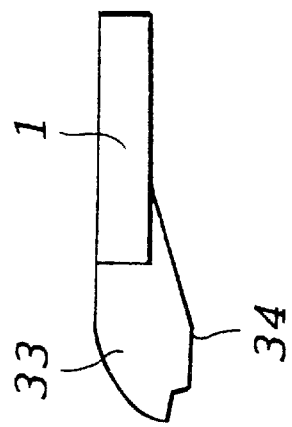
Figure 12:
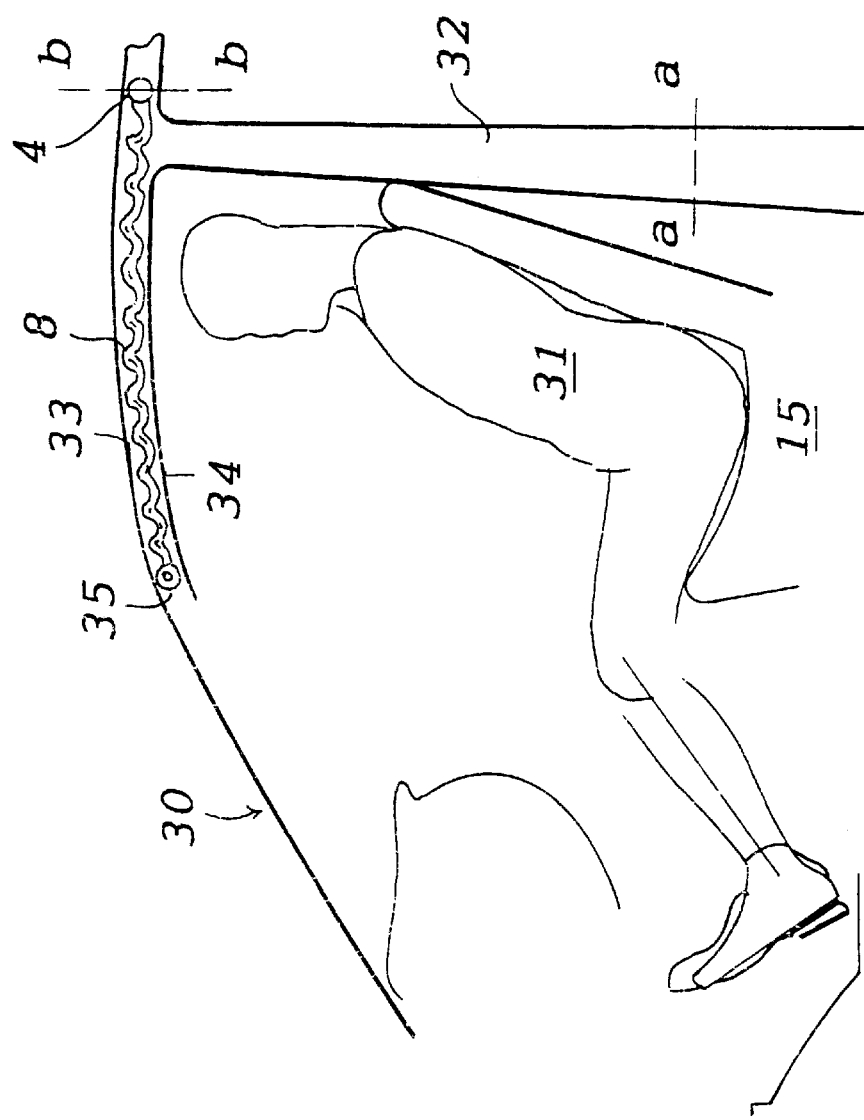

FIG. 12 illustrates a vehicle 30 with occupant 31 seated in front passenger seat 15 slightly forward of the vehicle side support beam 32 which is known generally as the B pillar. The B pillar 32 has the cross-section shown in FIG. 12a taken along line a—a. A pre-folded airbag 8 is situated between the vehicle roof 33 and the roof lining material 34 and is attached therein by a mechanical attachment 35 at one end and a manifold 4 at its other end. The manifold is connected to a 25 mm hybrid inflator 1 also located in the region of the roof FIG. 12b illustrates the cross-section of the roof (not to the same scale as FIG. 12).

Figure 13B:
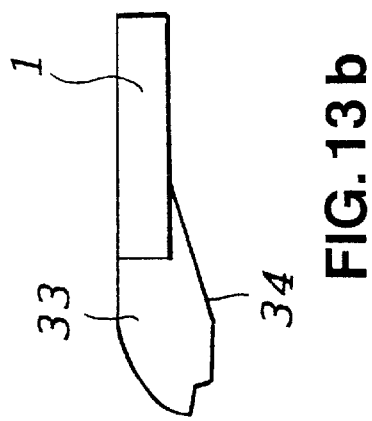
Figure 13A:
Figure 13:
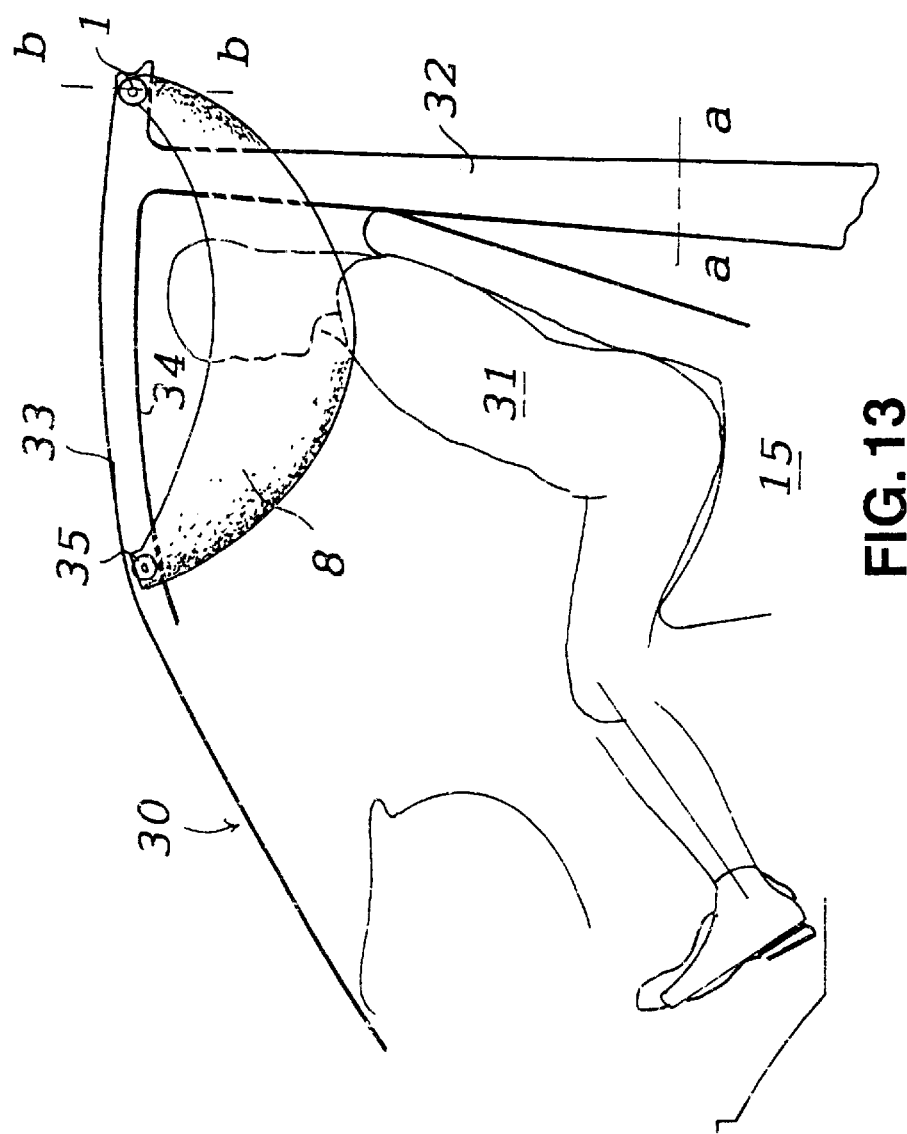

FIG. 13 illustrates the arrangement of FIG. 12 with the airbag cushion 8 deployed. Like features are denoted by like reference numerals. The airbag cushion 8 is a generally elongate sausage-shape when inflated and hence an optimum protection is achieved for the vehicle occupant 2.

Figure 14:
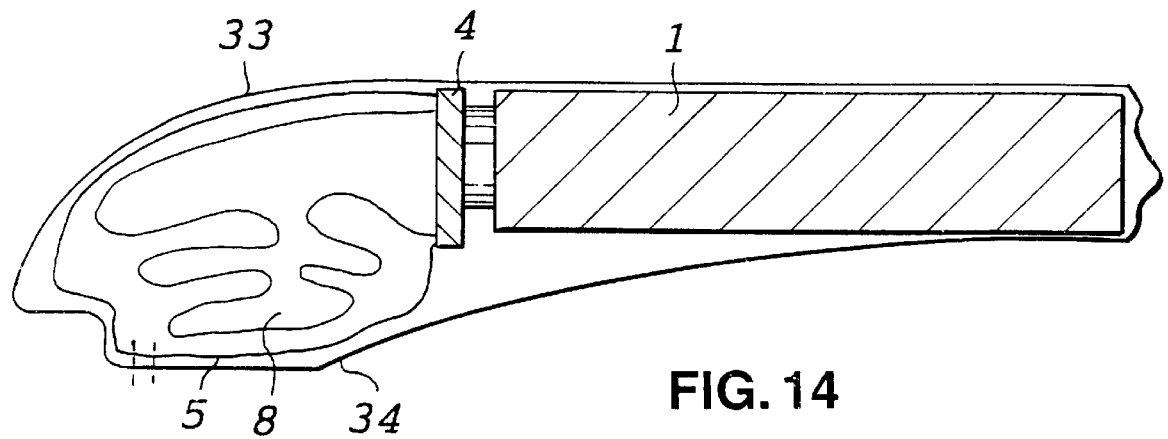
FIG. 14 is a cross-section along the line b—b of FIG. 12.
Figure 15:
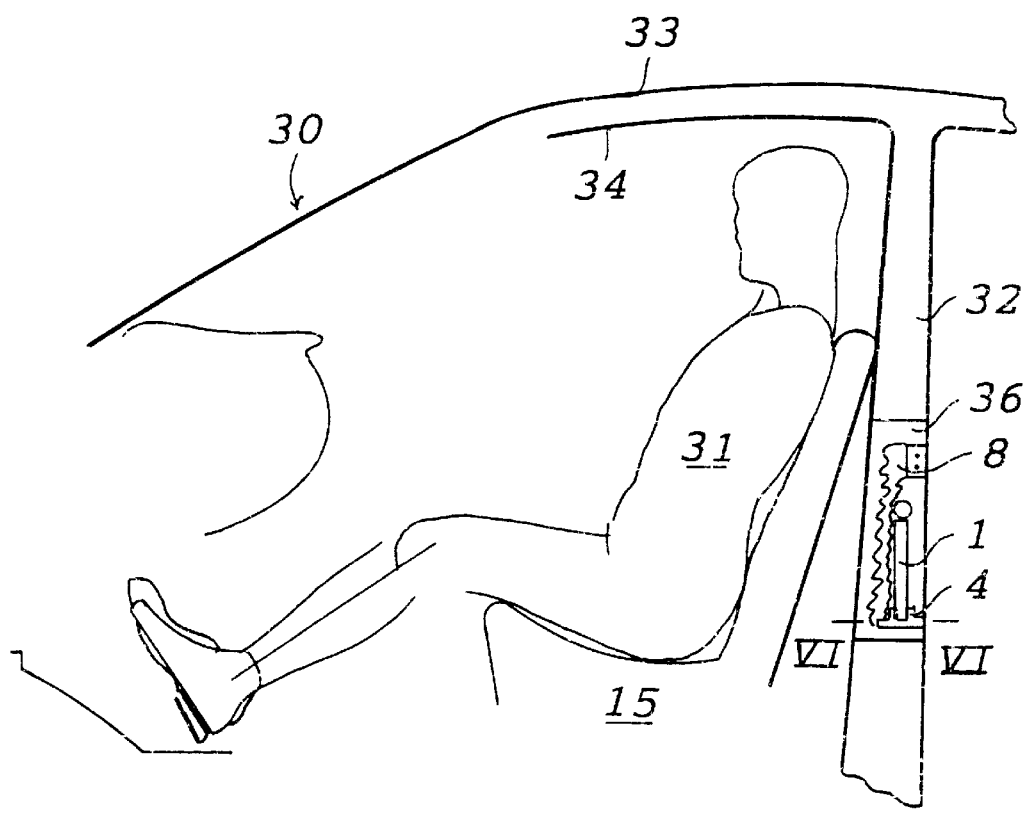
FIGS. 15 and 16 illustrate an inflatable safety restraint arrangement according to the present invention in a deflated and inflated state respectively showing an airbag cushion mounted in a pillar.

FIG. 14 illustrates to a larger scale the arrangement in cross-section along line b—b in FIG. 12. The pre-folded airbag cushion 8 would typically have a capacity of 15 litres and is contained in a fabric pocket 5 between the roof 33 and the roof lining 34. It is connected via manifold 4 to a 25 mm inflator 1 also fixed to the roof FIG. 15 illustrates an alternative arrangement wherein the side impact airbag cushion 8 is located within recess 36 of B pillar 32. Like features are denoted by like reference numerals. The airbag cushion 8 is folded around a 25 mm inflator 1 and connected thereto by manifold 4.

Figure 16:
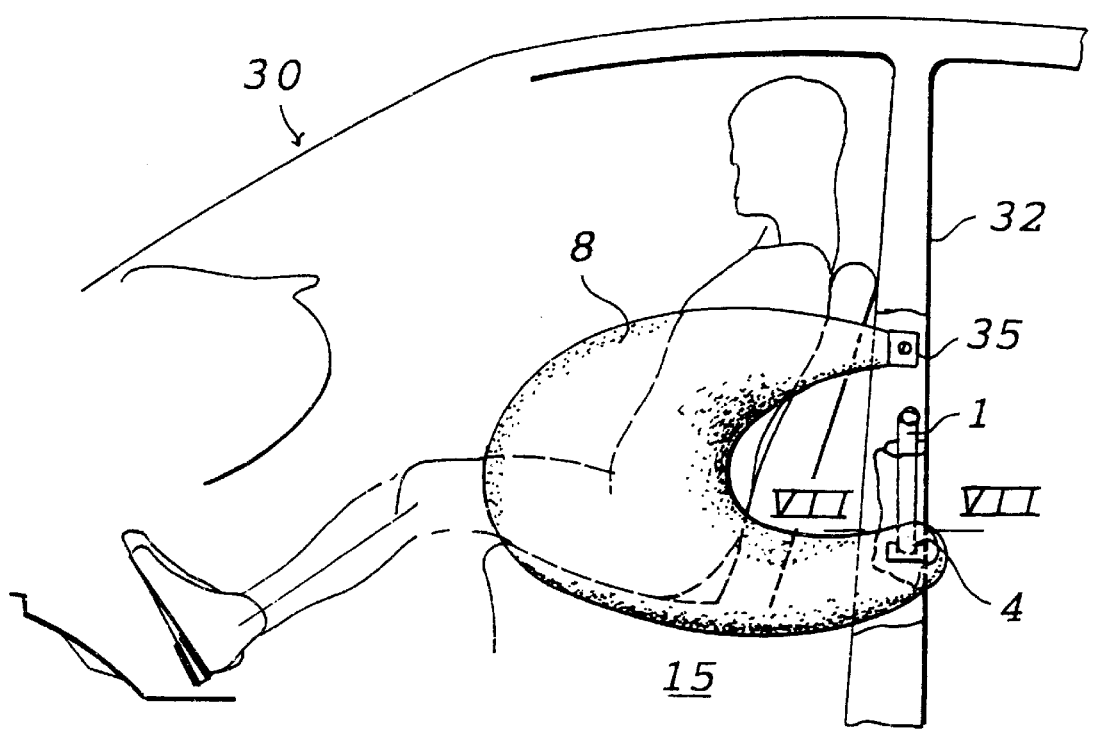

FIG. 16 illustrates the arrangement of FIG. 15 with the airbag cushion 8 inflated. The airbag cushion 8 is attached at its one end by mechanical attachment 35 to the B pillar 32 and at its other end by manifold 4 to the inflator 1 which is fixed in the B pillar 32. Hence the central section of the airbag balloons out, as shown, towards the vehicle occupant 2 to achieve an optimum position to protect the occupant's hips and arm and, depending upon the positioning of the attachments, the occupant's shoulder area. Of course the airbag arrangement of FIGS. 12 to 14 may be combined with the airbag arrangement of FIGS. 15 and 16 to provide protection for an occupant's head as well as side torso areas.

Figure 17:
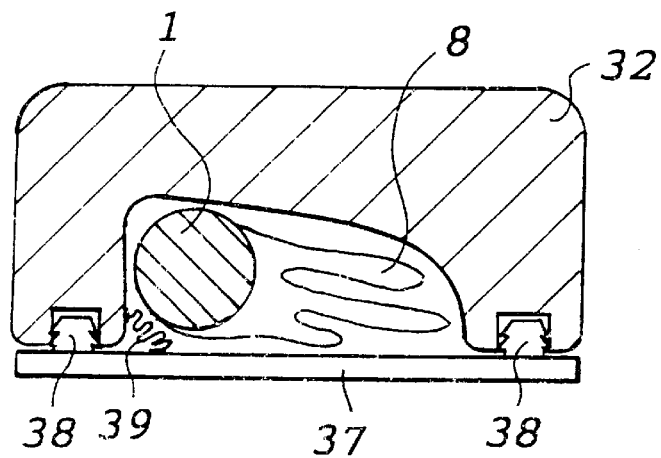
FIGS. 17 and 18 are cross-sections on line vi—vi of FIG. 15 and line vii—vii of FIG. 16 respectively.

FIG. 17 illustrates a cross-section taken along line vi—vi of FIG. 15. Airbag cushion 8 is folded around infator 1 into recess 36 of B pillar 32. The cushion 8 is retained in the recess by means of door 37 attached to the B pillar by studs 38 and by strap 39.

Figure 18:
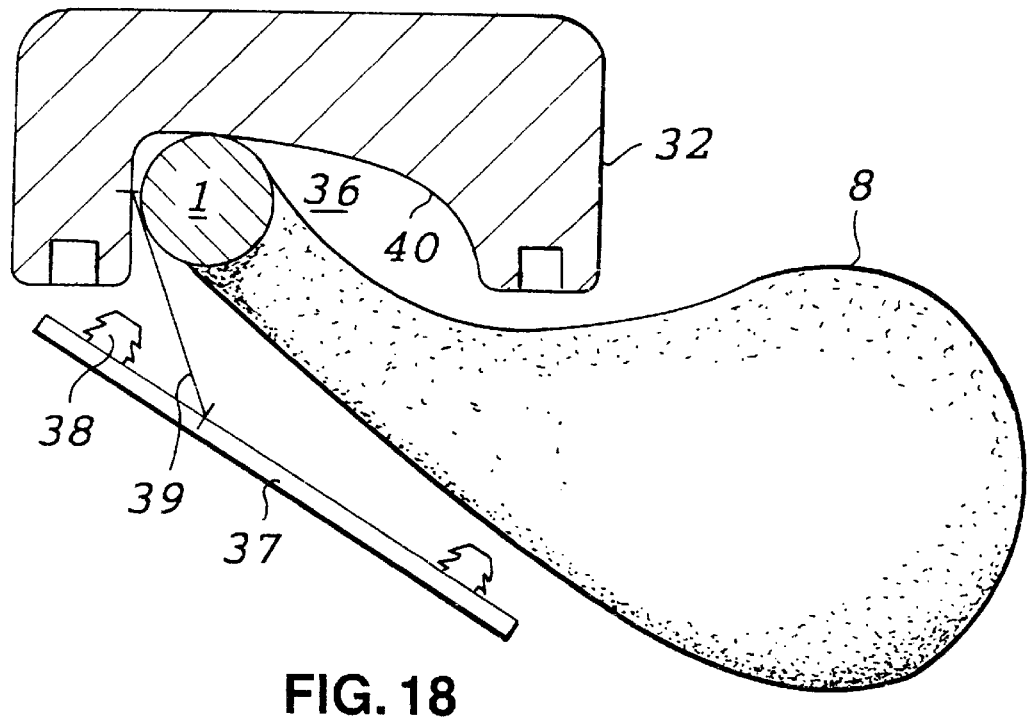

As can be seen from FIG. 18, as the cushion 8 is inflated in a crash situation, the door 37 can snap out of engagement with the B pillar 32 and swing open, (held by strap 39), to allow the bag to inflate. The contour 40 of the recess 36 is designed to urge the inflating cushion out of the recess in a forward direction, (and towards the driver). The shape of the airbag cushion, being an elongate sausage-shape, together with the arrangement of the door 37 being attached by strap 39 on the rearward side, combine to encourage the airbag cushion to inflate in the optimum manner to rapidly provide a protective cushion in the most vulnerable parts of the vehicle occupant's torso.

Figures 19A, 19B:
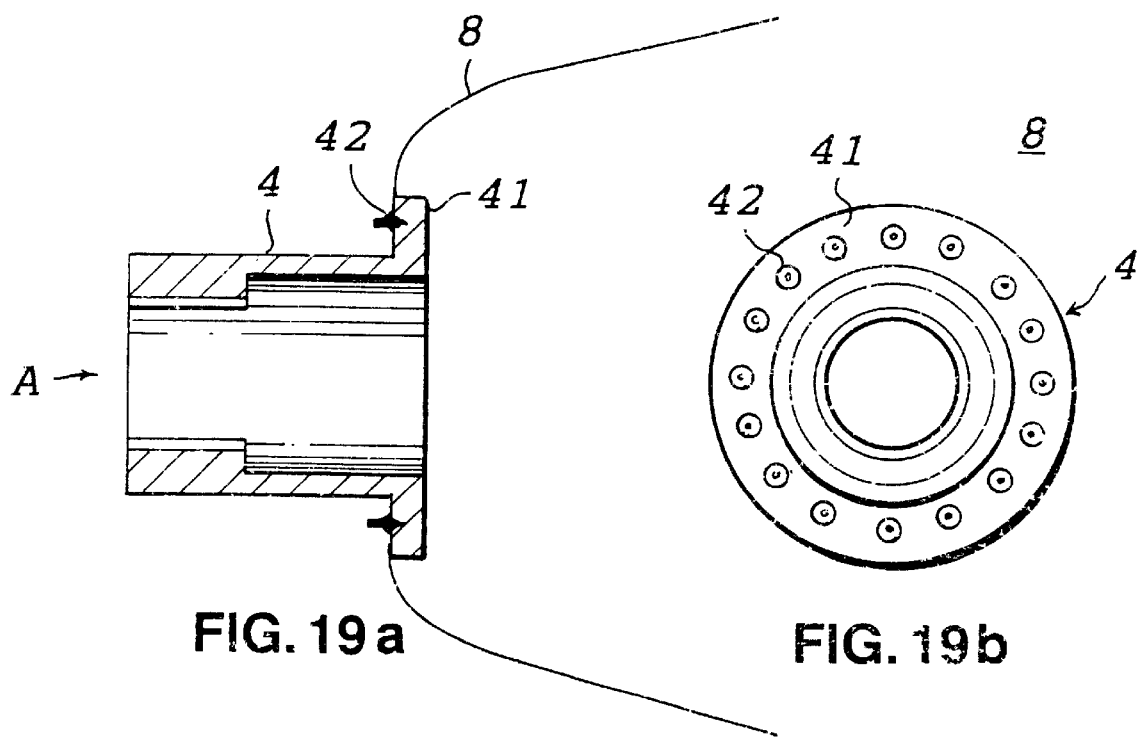

FIG. 19a illustrates the attachment of manifold 4 to airbag cushion 8 in cross-sectional side view whereas FIG. 19b illustrates a plan view of the manifold 4 looking in the direction A in FIG. 19a. The manifold 4 is made of a plastics material such as polyvinylchloride (PVC) or nylon and has a radially extending flange 41. The fabric of airbag cushion 8 is also a plastics material such as PVC or nylon and the airbag cushion is welded to radial flange 41 of the manifold by ultrasonic welding between a plurality of heat stakes 42 arranged at spaced points (as shown in FIG. 19b) around the flange and the airbag cushion fabric.

Figure 20:
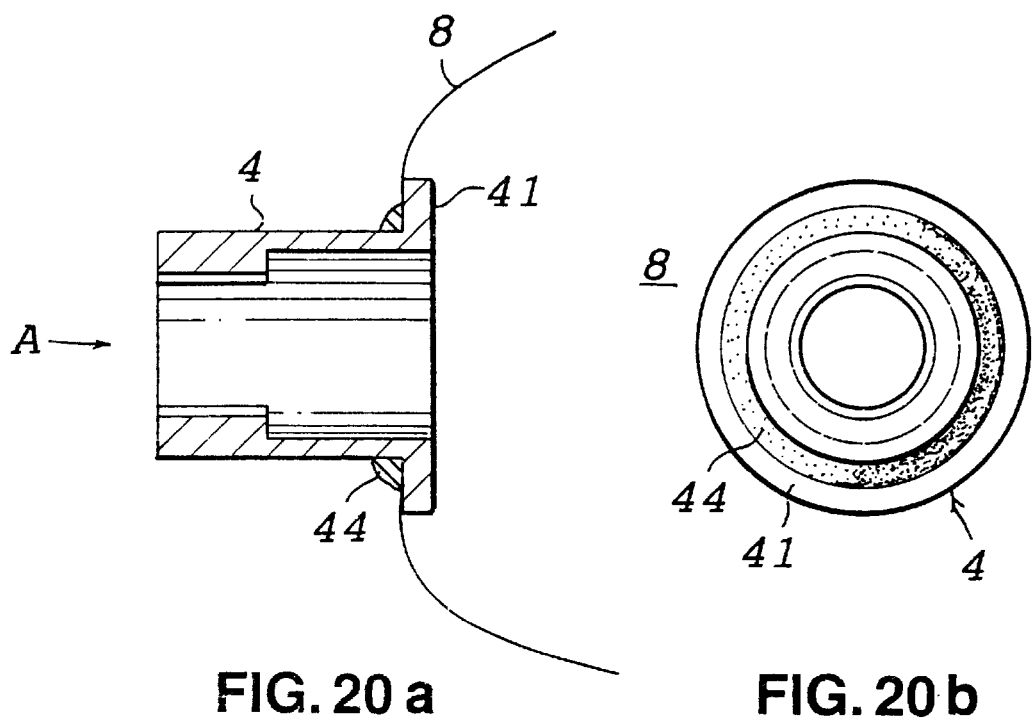

In FIGS. 20a and 20b again the manifold or at least the flange area 43 and the airbag cushion 8 is formed from plastics material such as PVC or nylon. Here however a continuous seal 44 is formed between the manifold and the airbag by a continuous weld around the circumference of the radial flange 41.

Figure 21:
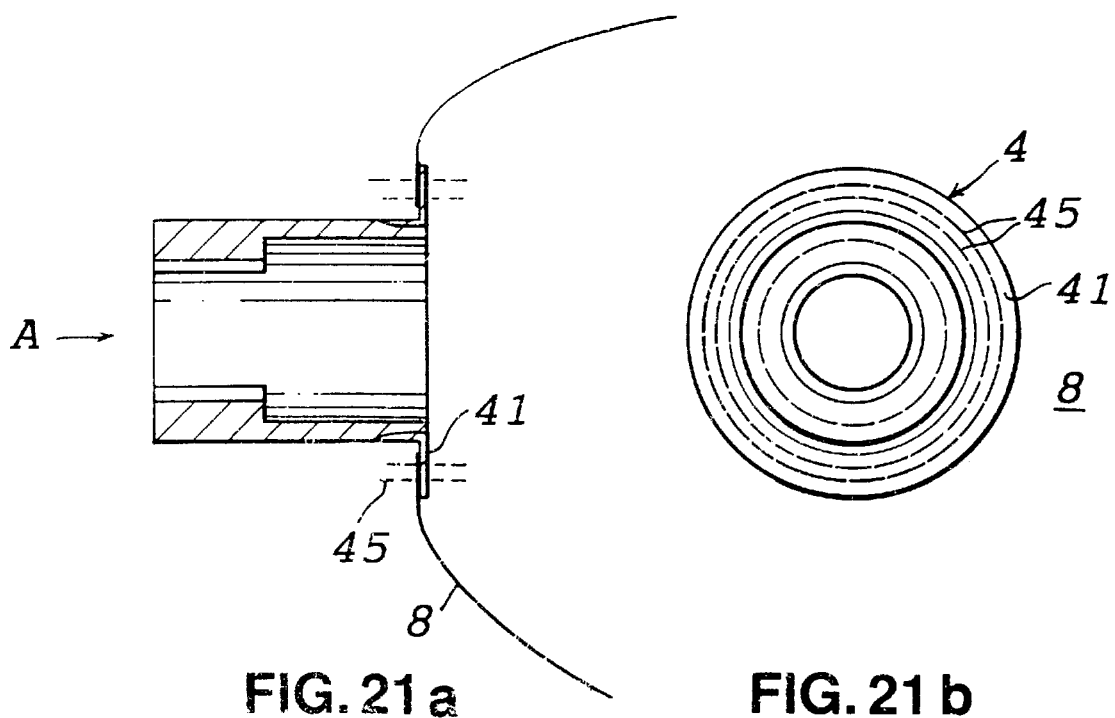

In FIGS. 21a and 21b the connection between the radial flange 41 and the airbag 8 is made by a double line 45 of sewing. Again both materials are PVC or nylon. Of course a single line of stitching could be used.

Figure 22:
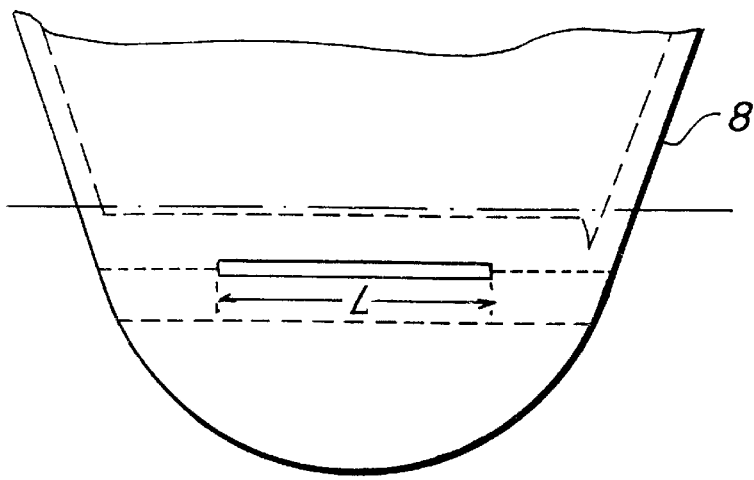
FIGS. 22 and 23 show a manifold opening for an airbag arrangement according to the invention before and after assembly of the manifold.

FIG. 22 illustrates a split stitched seam manifold opening for the cushion 8. The manifold opening has a length L equal to half the circumference of the manifold to be used. It is formed by lines of stitching as shown and is found generally in the side of the end of the cushion 8 allowing the inflator to be mounted as 90° to the elongate direction of the cushion.

Figure 23:
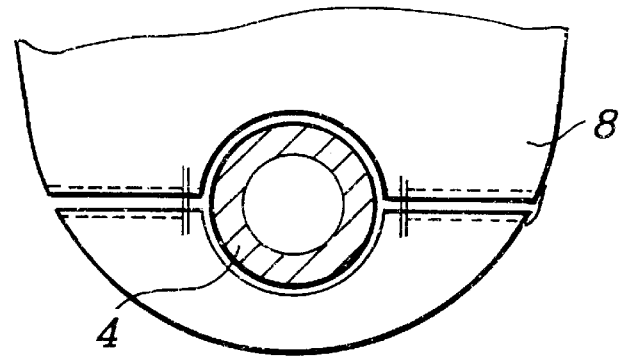

FIG. 23 illustrates the manifold 4 as sewn in to the cushion manifold opening.

Figure 24:
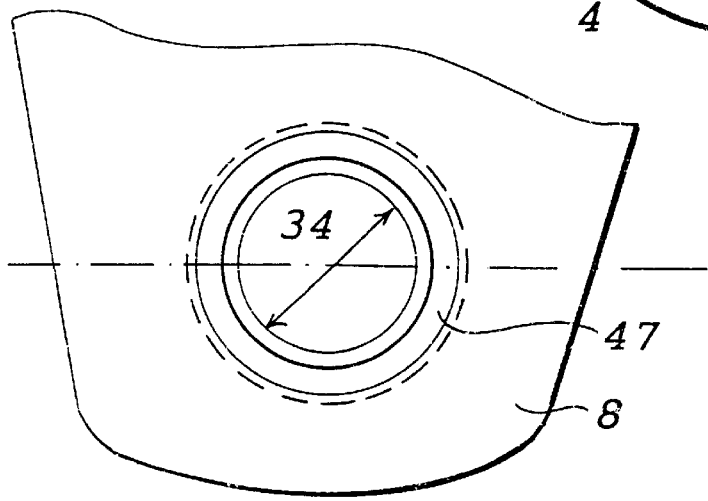
FIG. 24 shows an alternative manifold opening.

In FIG. 24 the manifold is shown in more detail with an O-ring 47 providing further support for the manifold.

Figure 25:
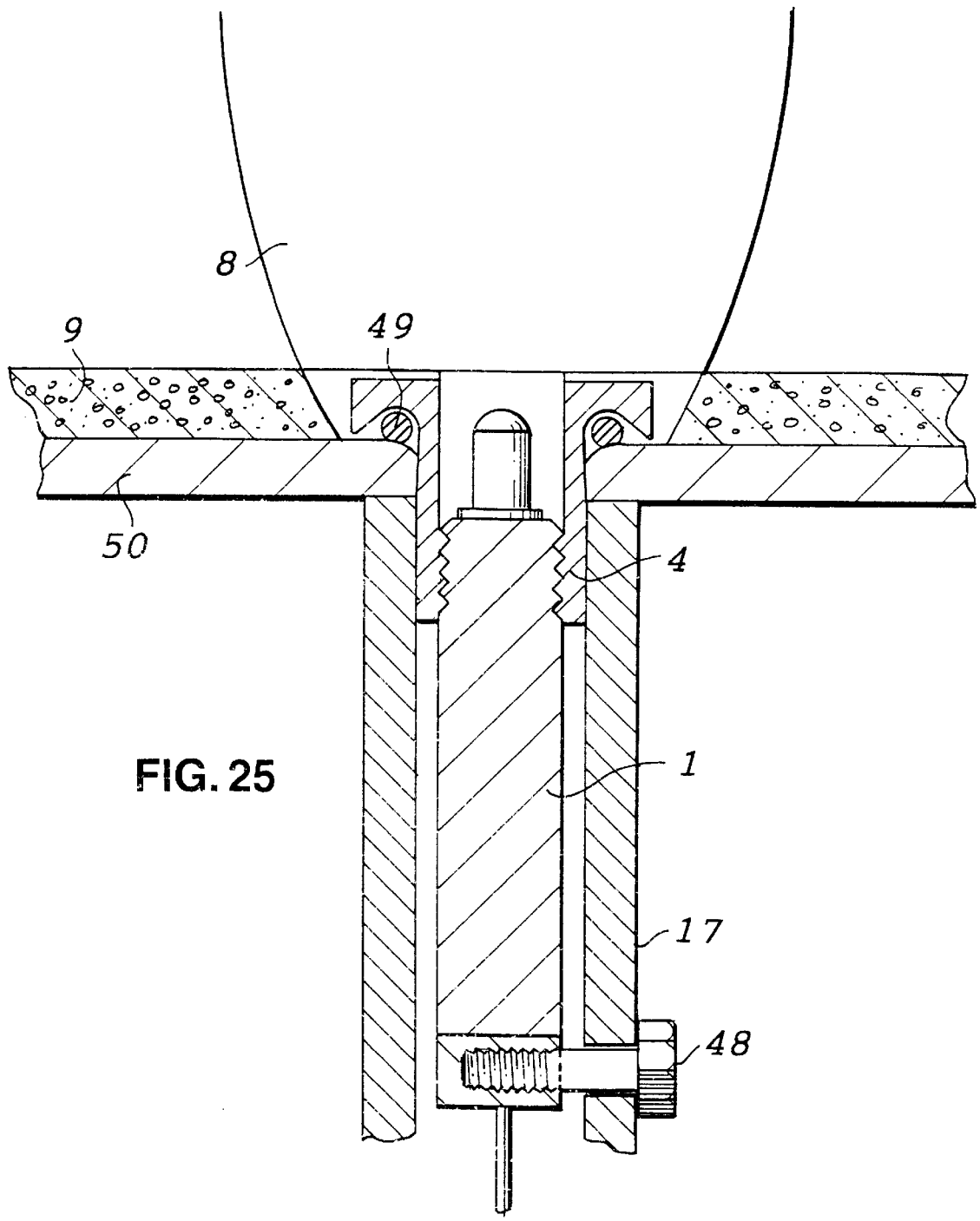
FIG. 25 is a cross-sectional view of the manifold and airbag opening of FIG. 24.

FIG. 25 illustrates how the manifold cushion and inflator may be connected together. The inflator 1 is bolted to the seat structure for example the seat back tube 17 by means of bolt 48. Alternatively it may of course be attached to the vehicle side beam or the structural part of the roof for the embodiments in which the cushion is mounted in other parts of the vehicle. The manifold 4 surrounds the top portion of the inflator 1 and is attached to cushion 8 with further reinforcement being given by a plastic rib 49 which is sewn or inserted into the cushion inflation inlet opening. The manifold 4 is itself attached to a side part 50 of the structure of the seat which is covered by foam 9.

The inflator may be bolted to the manifold or attached by a nut or it may be attached by a quick connection device such as a snap ring, i.e. an open piston ring which stretches to seal between the inflator and the manifold. The advantage of a quick connection fastening is that it allows the inflator to be inserted as a last operation in the assembly of the safety restraint system. This is of course important from a safety angle.

Figure 26:
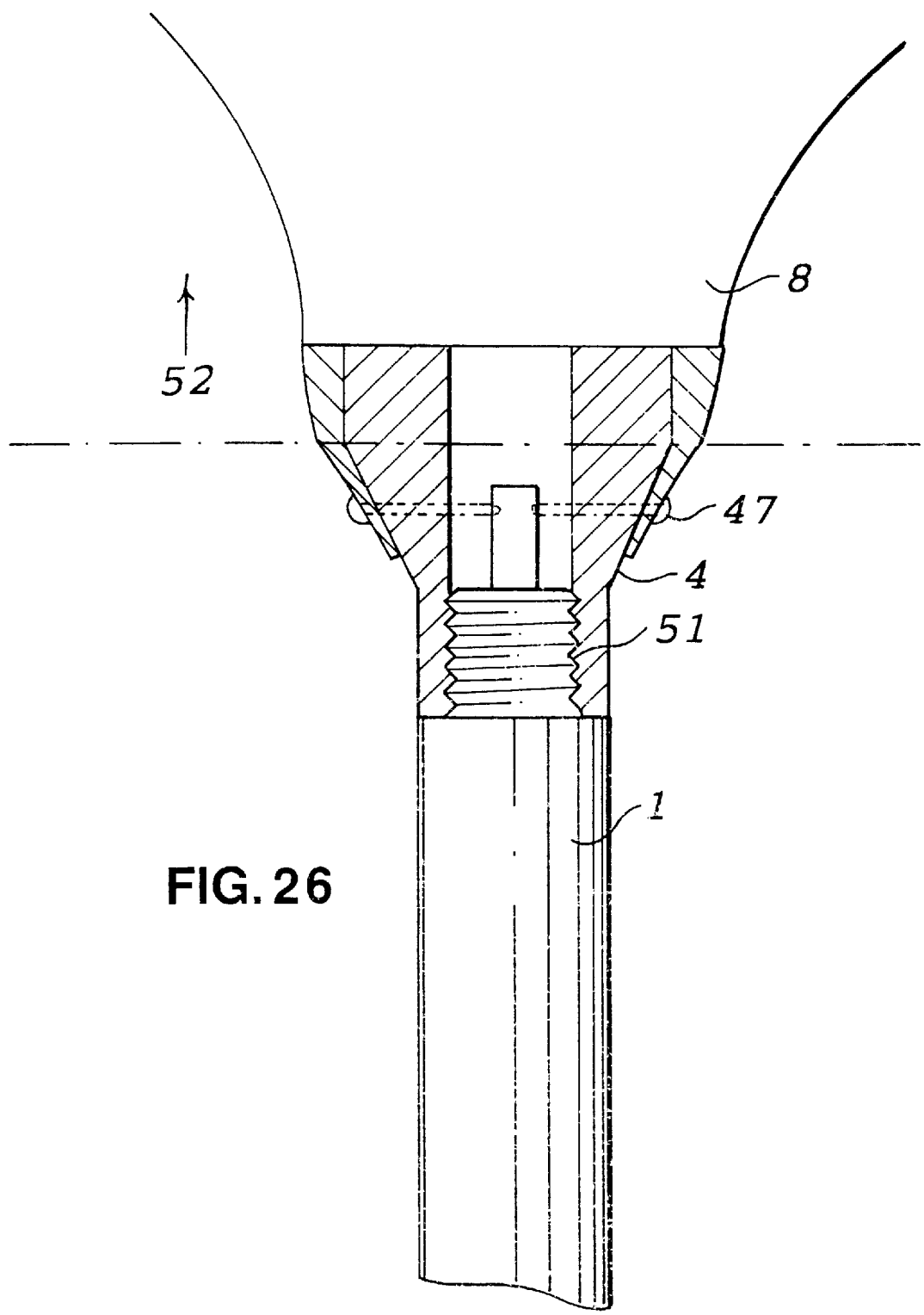
FIG. 26 is a cross-sectional view of an alternative arrangement showing connections of inflator, manifold and airbag cushion.

In FIG. 26 the inflator 1 is shown screwed by screw threading 51 into the manifold. An O-ring 47 is shown to strengthen the inflation inlet of cushion 8. The pulling force of the cushion load direction 52 tends in this case to aid sealing of the manifold.

It will be clear that many other specific embodiments are possible within the scope of the invention as defined by the claims. In particular many combinations of the preferred features are envisaged.

I claim:

1. An inflatable safety restraint arrangement comprising an inflatable cushion dispose proximate a stricture having a tearable seam, including a rip cord attached at one end to a part of the cushion and at an opposite end to a part of the seam, so that as the cushion deploys the rip cord tears the seam.

2. The arrangement according to claim 1 wherein the seam comprises a stitch seam and wherein the rip cord is connected to the seam so as to effectively unravel the seam on deployment of the cushion.

3. An inflatable safety restraint for protection of a vehicle occupant from components of crash forces, the arrangement comprising an inflatable cushion, the cushion being fixedly attached to at least two spaced positions such that on deployment at least a part of the cushion occupies a position between the thorax of the vehicle occupant and an adjacent internal surface of a side of the vehicle in the event of a crash situation being detected, and further comprising an inflator and an inflator manifold for connecting the inflator to the cushion, wherein the inflator has an output for inflation gas which is constructed and arranged to direct gas flow onto an inside wall of the manifold so-as to retain the manifold in the cushion.

4. An inflatable safety restraint arrangement according to claim 3 wherein the inflator is mountable approximately perpendicular to the direction of inflation of the cushion.

5. The arrangement according to claim 3 wherein the cushion is constructed so as to have, in an inflated condition, an elongated arcuate shape with a central region of relatively large cross sectional circumference and tapering end regions of smaller cross sectional circumference and further having two attachment points one at each of said end region of the cushion.

6. An inflatable safety restraint arrangement according to claim 5 wherein the cushion, in a deflated state is mounted in a flexible pocket having a long and short dimension and an elongate form tapering in the direction of the long dimension and is arranged and adapted to open along a line of weakness starting at its widest part.

7. An inflatable safety restraint arrangement according to claim 6 wherein the flexible pocket is formed of fabric material and the line of weakness comprises a stitched seam.

8. An inflatable safety restraint arrangement according to claim 7 wherein said stitched seam is adapted to open by tearing stitching on deployment of the cushion.

9. An inflatable safety restraint arrangement according to claim 5 wherein the cushion is mounted in a recess in a structural side beam of the vehicle.

10. An inflatable safety restraint arrangement according to claim 9 wherein the recess is closed by a deployment door which is retained to the beam by a flexible tether.

11. An inflatable safety restraint arrangement according to claim 9 comprising two inflators mounted in the recess in the side beam.

12. An inflatable safety restraint arrangement according to claim 5 wherein the inflator is mounted in a recess in a structural side beam.

13. An inflatable safety restraint arrangement according to claim 5 wherein the cushion is mounted in a roof of a vehicle in such a position that on deployment at least a part of the cushion occupies a position between the occupant's head and a vehicle door.

14. An inflatable safety restraint arrangement according to claim 13 wherein the cushion, in a deflated state is mounted in a flexible pocket which includes a line of weakness, the line of weakness of the pocket is aligned with a seam of roof lining material.

15. An inflatable safety restraint arrangement according to claim 13 further comprising an inflator mounted in the roof of the vehicle.

16. An inflatable safety restraint arrangement according to claim 5 wherein the cushion, in a deflated state, is mounted in a flexible pocket, the flexible pocket including a line of weakness, the cushion and pocket mounted in a seat back, the arrangement further comprising a cover for said seat back and wherein the flexible pocket is contained within said cover so as to follow the contours of the seat back.

17. An inflatable safety restraint arrangement according to claim 16 wherein the at least two spaced positions are spaced by a distance less than the length of the inflated cushion, the flexible pocket having a length substantially less than the height of the vehicle seat back.

18. An inflatable safety restraint arrangement according to claim 16 wherein the flexible pocket is mounted within the vehicle seat cover in such a way that the line of weakness is aligned with a seam of the seat cover so that the inflating cushion deploys through the line of weakness and through the seam of the seat cover in the event of a crash situation being detected, and the cushion inflates through a predetermined location of the seat.

19. An inflatable safety restraint arrangement according claim 5 wherein the cushion comprises a first portion extending between said two attachment points which first portion is adapted to deploy to a position between the torso of the vehicle occupant and a vehicle door, and a second portion extending away from the attachment points and adapted to deploy to a position between the head of the occupant and the vehicle door.

20. An inflatable safety restraint arrangement according to claim 5 wherein the cushion is shaped and constructed so that on inflation at least a part of the cushion is fat.

21. An inflatable safety restraint arrangement according to claim 5 wherein one of the attachment points is arranged to be above an occupant Is shoulder, in normal use by an adult.

22. An inflatable safety restraint arrangement according to claim 5 wherein an inflator is provided for the cushion and is mounted directly to a part of a seat frame by mounting in a seat frame tube such that the tube provides a housing for the inflator.

23. An inflatable safety restraint arrangement according to claim 22 wherein said housing comprises a tube which runs generally horizontally in the lower portion of the backrest of the seat.

24. An inflatable safety restraint arrangement according to claim 23 wherein said inflator comprises a hybrid inflator having a diameter of about 25 mm.

25. An inflatable safety restraint arrangement according to claim 22 wherein the inflator is screw fitted into said tube.

26. An inflatable safety restraint arrangement according to claim 3 wherein in the deflated state, the cushion is stored within a flexible pocket, the flexible pocket including a line of weakness along which the pocket opens, the flexible pocket is formed of a flexible plastic material and said line of weakness comprises the line along which opposing surfaces of the pocket are connected with rivets adapted to burst on deployment of the cushion.

27. An inflatable safety restraint arrangement according to claim 26 wherein said rivets are of a plastics material.

28. An inflatable safety restraint arrangement according to claim 3 wherein the cushion comprises an opening for receiving the manifold which opening comprises a slit-seam of a length equal approximately to half the outside circumference of the manifold so as to fit closely around the manifold.

29. An inflatable safety restraint arrangement according to claim 3 wherein said manifold is formed of plastic material.

30. An inflatable safety restraint arrangement according to claim 29 wherein the manifold has an outer surface which is attached to a manifold mounting area of the cushion by a welded join.

31. An inflatable safety restraint arrangement according to claim 30 wherein the welded join is a continuous unbroken seal around the manifold opening.

32. An inflatable safety restraint arrangement according to claim 29 wherein the manifold has an outer surface which is attached to a manifold mounting area of the cushion by stitching.

* * * * *